United States Patent
Shakiba

(10) Patent No.: US 10,425,257 B1
(45) Date of Patent: Sep. 24, 2019

(54) DECISION FEED-FORWARD REDUCED-STATE SEQUENCE DETECTION

(71) Applicant: Mohammad Hossein Shakiba, Richmond Hill (CA)

(72) Inventor: Mohammad Hossein Shakiba, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/954,205

(22) Filed: Apr. 16, 2018

(51) Int. Cl.
H04L 25/03 (2006.01)

(52) U.S. Cl.
CPC .. *H04L 25/03197* (2013.01); *H04L 25/03229* (2013.01); *H04L 25/03312* (2013.01)

(58) Field of Classification Search
CPC ......... H04L 25/03229; H04L 25/03235; H04L 25/03197; H04L 25/03312
See application file for complete search history.

(56) References Cited

U.S. PATENT DOCUMENTS

| | | | |
|---|---|---|---|
| 6,438,180 B1 | 8/2002 | Kavcic et al. | |
| 8,938,035 B1 | 1/2015 | Dai et al. | |
| 9,571,309 B1 * | 2/2017 | Sakai | H04L 25/03057 |
| 2005/0264906 A1 | 12/2005 | Haratsch | |
| 2009/0185643 A1 | 7/2009 | Fitzpatrick et al. | |
| 2010/0086011 A1 * | 4/2010 | Liu | H04L 1/0053 375/219 |
| 2018/0062671 A1 | 3/2018 | Cherubini et al. | |

OTHER PUBLICATIONS

G. D. Forney, Jr.,"The Viterbi Algorithm", Proceedings of the IEEE, vol. 61, No. 3, pp. 268-278, Mar. 1973.
M. V. Eyuboglu and S. U. H. Qureshi, "Reduced-State Sequence Estimation with Set Partitioning and Decision Feedback", IEEE Transactions on Communications, vol. 36, No. 1, pp. 13-20, Jan. 1988.
M. H. Shakiba, "Analog Viterbi Detection for Partial-Response Signaling", Ph.D. Dissertation, Department of Electrical and Computer Engineering, University of Toronto, 1997.
S. Olcer, "Reduced-State Sequence Detection of Multilevel Partial-Response Signals", IEEE Transactions on Communications, vol. 40, No. 1, Jan. 1992.
K. K. Parhi, "High-Speed Architectures for Algorithms with Quantizer Loops", IEEE Symposium on Circuits and Systems, pp. 2357-2360, 1990.

* cited by examiner

*Primary Examiner* — Sophia Vlahos

(57) ABSTRACT

Systems and methods are disclosed for detecting sequences of symbols in a received signal in the presence of inter-symbol interference. Maximum Likelihood Sequence Detection (MLSD) is a known method for optimum detection of such sequences. To reduce the complexity of the MLSD, a Reduced-State Sequence Detection (RSSD) technique has been considered based on partitioning the states of the MLSD. In this approach, a simplified sequence detector is placed within a global decision feedback loop. The disclosed architecture shortens the feedback loop by moving the sequence detector outside the loop and converting the interaction between the two to a feed-forward manner. This is achieved through slicing the signal and closing a nested loop around the sliced bins. A further variant simplifies the detector even more by reducing the number of bins.

22 Claims, 18 Drawing Sheets

DECISION FEED-FORWARD REDUCED-STATE SEQUENCE DETECTION

TECHNICAL FIELD

The present invention relates to a system and method for error correction in high speed data communication systems, and in particular to improving the speed bottleneck that exists in reduced-state sequence detection with decision feedback loop.

BACKGROUND

The detection of the received signal in a data communication system is challenging due to several factors. These factors include, but not limited to, noise, cross-talk, and Inter-Symbol Interference (ISI).

ISI, as its name indicates, is the interference caused by the transmission of one symbole to other symbols in the transmitted sequence. FIG. 1 illustrates a typical bandwidth-limited channel pulse response 100. Pulse response 100 shows a power dispersion (vertical) over time (horizontal axis 104). The peak 109 of the response 100 is considered to be indicative of the symbol transmitted. Symbol 109 will overlap with the symbols sent before and after it. Those skilled in the art will appreciate that it is not possible to abruptly terminate the power of a symbol without unwanted effects. Symbol 109 will contribute to interference with the subsequent symbol and the magnitude of this interference is illustrated by point 110 on the response curve. Symbol 109 will also interfere with the previously transmitted symbol and the magnitude of this interference is illustrated by point 120. Points 112 and 114 illustrate the interference with the second and third symbols transmitted after symbol 109, while point 122 indicates the interference contributed by pulse response 100 to the symbol transmitted two slots before pulse response 100. This figure illustrates the concept of signal dispersion in both the negative direction 106 and the positive direction 108. While this is a common ISI pattern for a channel pulse response, some channels may exhibit different ISI patterns.

Several methods to address ISI are known or suggested in the art. For example Decision Feedback Equalization (DFE), Feed Forward Equalization (FFE), and Maximum Likelihood Sequence Detection (MLSD) are commonly used to mitigate ISI in a variety of transmission environments. It will be understood that the above described ISI is simply one of a number of sources of noise in real world transmission channels. The choice of the proper detection scheme depends on many parameters, including the complexity of implementation of the detector. A combination of different detection techniques can also be employed.

Although MLSD results in a superior performance over DFE and FFE, it is considered to have a higher level of implementation complexity.

A further known technique, Reduced-State Sequence Detection (RSSD), is a variant of MLSD that sacrifices some of the performance of MLSD for a lower level of implementation complexity while still exhibiting superior performance relative to DFE and FFE. Decision Feedback Equalization (DFE) operates based on two assumptions: first, that the channel pulse response is known, or can be estimated by the receiver; and second, that prior to detection of any current symbol, the DFE successfully detected the previous symbols. With this information, the DFE process can proceed with detecting the current symbol by compensating for interference caused by the previous symbol or symbols. This interference from previous symbols is designated "post-cursor ISI" and it corresponds to the dispersion values 120,122, and so on from FIG. 1.

However, DFE is unable to remove the interference terms from the symbols that are transmitted after the symbol under detection, designated "pre-cursor ISI", which corresponds to the dispersion values 110,112,114, and so on from FIG. 1.

DFE implementations often use a slicer to obtain an initial estimate of symbol values from received samples based on comparison of the ISI-corrected sample to one or more threshold values. The slicer slices at these thresholds, binning the samples into one or more bins corresponding to one or more symbol values. Assuming that the estimated symbol values at the output of the DFE slicer correctly represent the transmitted symbols, the estimated symbols can be employed to construct a replica of the post-cursor ISI terms that the transmitted symbols corresponding to the estimated symbols had added to the current symbol. This is where the knowledge of channel pulse response is needed to apply the corresponding weights (calculated from the pre- and post-cursor dispersion levels from FIG. 1) to calculate different ISI terms. This estimated post-cursor ISI contribution can then be removed (i.e., subtracted) from the received signal to yield the current transmitted symbol. FIG. 2 illustrates this DFE operation, showing how a DFE loop 200 outputs estimated symbols 202 based on received samples 204. The DFE loop 200 first subtracts the sum of total calculated ISI 206 from N previous symbols from the received sample 204. The DFE loop 200 then passes the result through a slicer 208. The estimated current symbol 202 is provided as feedback to the loop 200 via a one-symbol delay node 210. This delayed symbol value represents the $1^{st}$ previous symbol 212, and it passes through a chain of (N−1) additional one-symbol delay nodes 210 to create a chain of each of the $2^{nd}$ previous symbol 214 through Nth previous symbol 216. Each such previous symbol 212,214, . . . 216 is weighted by a weight 222,224, . . . 226 corresponding to the magnitude of dispersion from that previous symbol into the current symbol (i.e. values 120,122 and so on from FIG. 1). By multiplying those weights 222,224, . . . 226 by the previous symbol values 212, 214, . . . 216, ISI values 232,234, . . . 236 are calculated for each previous term. The ISI values 232, 234, . . . 236 are summed to produce the total ISI 206.

DFE may not perform optimally for at least two reasons. First, it removes, hence ignores, the ISI components of the received signal that contain information about the stream of transmitted symbols (e.g., DFE loop 200 from FIG. 2 outputs an estimated symbol 202 that has had all calculated ISI terms 206 removed from it, making that information 206 unavailable to the system for use in further error-correction). Second, its reliance on feedback based on its previous decisions (e.g. estimated symbol 202 from FIG. 2 is fed back to loop 200) may result in error propagation, wherein the DFE makes even more errors if its previous decisions are faulty.

Feed Forward Equalization (FFE) operates differently, and is able to cancel both pre-cursor and post-cursor ISI. The basic operation of an FFE detector is based on two requirements. First, as with DFE, it assumes that the channel pulse response is known, or can be estimated by the receiver. Second, FFE processes the symbols after a delay so that the received symbol within that delay represent symbols that have been transmitted after the symbol under process—this delay enables FFE to handle pre-cursor ISI in addition to post-cursor ISI. Using this information, the FFE can proceed with detecting the current symbol (i.e. the symbol under process) by removing the interference terms from the previous as well as the next symbols that add ISI to the current symbol during transmission.

By passing the received signal through a chain of delay cells and deciding on the point along this chain that represents the symbol under detection, the FFE can calculate the ISI terms that were caused by the previous symbols as well as the next symbols. This is where the knowledge of channel pulse response is needed, to apply the corresponding weights to calculate different ISI terms. The total ISI replica can then be removed (i.e. subtracted) from the received signal to yield the current transmitted symbol. FIG. 3 illustrates this FFE operation, showing how an FFE system 300 uses a pre-cursor ISI error-correction loop 302 and a post-cursor ISI error-correction loop 304 to remove pre-cursor ISI 306 from P next symbols and post-cursor ISI 308 from N previous symbols, respectively, to generate an ISI-free sample 310 by subtracting the pre-cursor ISI 306 and post-cursor ISI 308 from the current sample 312. The current sample 312 is the result of a P-long chain of one-symbol delay nodes 314 applied to the received samples 316. The received samples 316 and each incrementally delayed sample 318 . . . 320 in this chain correspond to the Pth next symbol 316 through $1^{st}$ next symbol 320 relative to the current sample 312. Each of these symbols 316 . . . 320 has a weight 322 . . . 324 applied to it, much like in the sample DFE loop 200, but here the weights 322 . . . 324 correspond to the pre-cursor dispersion values 110,112,114, and so on from FIG. 1. As in DFE loop 200, these weighted ISI values 326 . . . 328 derived from the Pth next symbol 316 through $1^{st}$ next symbol 320 are summed to produce the total pre-cursor ISI 306.

The current sample 312 has a further N-long chain of one-symbol delay nodes 314 applied to it to generate the $1^{st}$ previous symbol 330 through Nth previous symbol 332 relative to the current sample 312. These symbols 330 . . . 332 are weighted to calculate ISI terms 334 . . . 336, which are then summed in much the same way as a DFE loop such as DFE loop 200 to produce the total post-cursor ISI 308.

The ISI-free sample 310 (or ISI-compensated sample, the terms will be understood by those skilled in the art as being used somewhat interchangeably) is processed by a slicer 340 to produce an estimated symbol 350. Notably, this estimated symbol 350 is not used to provide feedback to the FFE system 300, unlike with the example DFE loop 200.

FFE may not perform optimally for at least two reasons. First, like DFE, it removes, hence ignores, the ISI components of the received signal that contain information about the stream of transmitted symbols. Second, FFE may result in noise enhancement, since contrary to DFE which uses noise-free sliced symbols (e.g. estimated symbols 202) to remove their ISI terms (e.g. estimated symbols 202 are fed back to DFE loop 200), FFE uses delayed versions of the received signal prior to slicing them. Any noise present in the received signal may thus contribute to the overall noise, hence enhance it when weighted versions of that signal are summed (such as the summation of values 326 . . . 328 and values 334 . . . 336, each of which is derived by weighting a delayed version of the potentially noisy received signal 316).

Maximum Likelihood Sequence Detection (MLSD) provides a third method of ISI detection/cancellation as an alternative to (or in addition to) DFE and FFE. The basic operation of an MLSD detector is based on the fact that ISI terms convey useful information and can therefore be included in the detection process to improve detector performance. This is in contrast with DFE and FFE, which calculate ISI terms in order to remove them from the received signal.

By including the interaction between different symbols in the detection process, the received symbols can be processed as a sequence rather than as individual symbols. This introduces the concept of "sequence detection".

However, inclusion of the entire signal (or the inclusion of all the samples representing the signal) is often impractical and could involve infinite latency and complexity in the detection process. As a result, the MLSD system operates on a sequence of samples from the signal of predetermined length, with this length being based on a trade-off between the truncation penalty and various practical considerations.

Importantly, in addition to ISI, the received signal is also contaminated by noise. Thus, the problem of sequence detection becomes the choice of a particular sequence among all possible sequences that best resembles the transmitted sequence in the presence of this combination of interference (ISI) and noise. This choice of a particularly likely sequence of symbols is what "maximum likelihood sequence detection" refers to.

FIG. 4 illustrates an example of maximum likelihood sequence detection (MLSD) from among possible sequences that start from equivalent initial conditions. On the left is a table 402 showing all possible permutations of a sequence three symbols in length in an encoding scheme having three symbol values (A, B, and C). The highlighted row shows an example sequence permutation 404: "C C A". This sequence is used in the following example of MLSD as the actual transmitted sequence being detected via the MLSD technique.

On the right in FIG. 4 is a graph 410 showing all possible transitions between consecutive symbols in such a length-3 sequence. Each such transition has an associated "cost": a penalty associated with that transition. This cost penalty, also called a "branch metric", is calculated by a technique outlined in detail below: in general terms, the magnitude of the cost penalty is inversely proportional to the likelihood of that transition actually having transpired at that point in the transmitted signal based on the closeness of the received signal to the expected value associated with that transition. In the illustrated example, the transition 412 from upper left node "A" 414 to upper middle node "A" 415 has a branch metric, or cost penalty, of 1. The transition 416 from lower middle node "C" 418 to middle right node "B" 420 has an associated cost penalty of 7. The graph 410 denotes example cost penalties/branch metrics for each of the transitions.

To calculate the most likely transmitted sequence based on a received signal, an MLSD system begins by setting the initial cost at the start of all sequences (on the far left side) to zero. Moving from left to right in graph 410, each subsequent node in the graph (such as node 418) is given a minimum accumulated cost equal to the lowest branch metric of all the transitions leading to it (in this case transitions 422, 424, and 426 from left-side nodes "A", "B", and "C" respectively). In the case of node 418, the minimum accumulated cost is zero, corresponding to the minimum of the branch metrics of each of transitions 422 (branch metric=4), 424 (branch metric=3), and 426 (branch metric=0).

The "winner" (i.e. the most likely transmitted sequence as determined by the MLSD) corresponds to the path through the graph 410 that has, in total, the lowest minimum accumulated cost. In this case, that detected "winner" sequence is "C C A", due to the lowest minimum accumulated cost.

The minimum accumulated cost for each symbol at each time step is shown in the graph 410 with arrows 428 pointing to the node where they came from. The lowest cost path leading to each symbol at each time step is shown in either bold lines 430 or dashed bold lines 432 in the graph 410. The final lowest cost path that results in the lowest cost at the end of the sequence is shown by the solid bold lines 430. The dashed bold lines 432 indicate the temporary optimum paths that lost the competition.

As shown in FIG. 4, an MLSD detector tries to find the path with the lowest accumulated cost among all possible paths that pass through different nodes of the graph through the allowed transitions that are labeled by their corresponding transition cost penalties.

Throughout this specification, and particularly in the context of MLSD, familiar terms used in data communications may be used interchangeably with the following more generic terms: "path" and "sequence"; "accumulated cost" and "state metric"; "node" and "state"; "graph" and "trellis"; "transition" and "branch"; and "transition cost" (or "cost" or "cost penalty") and "branch metric".

Branch metrics used in MLSD may be calculated by using a cost penalty criterion, such as absolute or mean square, to the difference (error) between an expected value and a measured value of a received signal at a given time. The expected value may be calculated with reference to a known or estimated transfer function of a communication medium.

An MLSD detector may be implemented by an application of the Viterbi Algorithm, which is known in the art and described in detail by G. D. Forney, Jr. in "The Viterbi Algorithm," Proc. of the IEEE, Vol. 61, No. 3, pp. 268-278, March 1973.

An MLSD receiver seeking to maximize the accuracy of the sequence detection process would wait until the entire transmitted sequence is received before deciding on the most-likely sequence. However, to minimize the detection latency, this waiting period can be shortened at the price of some performance penalty. The trade-off between the latency and performance degradation depends on several factors including the structure of the trellis diagram and practical limitations. A general rule of thumb is to wait several symbol times equal to at least 4 to 6 times the number of states of the trellis before applying the MLSD to detect a sequence of symbols. Thus, when receiving a 4-PAM signal with four symbol values, an MLSD should wait to receive 16 to 24 symbol intervals of the signal before applying the MLSD process to identify most likely states (i.e. the states with minimum accumulated costs). The decision waiting time is called the path memory depth, and is stated in terms of the number of symbol intervals. It is important to note that this delay does not apply to processing the signal. Branch metric, state metric, and updating the content of the path memory with the latest survivor trace-back continue to happen sequentially and continually at every signal interval. Only the final decision-making step of the MLSD process (i.e. identifying the states having minimum accumulated cost) is delayed.

This delay ensures that enough information of the signal has been processed. The delay gives the detector enough time so that the surviving path memories are likely to merge: i.e., a backwards traverse of the trellis tends to result in paths of least accumulated cost converging at the same node and thereafter (traversing backwards) being identical. This reduces the number of paths that need to be calculated for the remainder of the backwards traverse starting at the node where the convergence occurs. For example, suppose that a backwards traverse of a trellis results in the determination that the path with lowest accumulated cost passing through node "A" at time t is a path that also passes through node "A" at t−1. It also results in the determination that the path with lowest accumulated cost passing through node "B" at time t is a path that also passes through node "A" at t−1. In that case, the two paths will be identical traversing backwards from node "A" at time t−1, and will only need to be calculated once (i.e. as a single, converged path).

If this symbol decision process repeats at every symbol interval at a speed equal to the signal transmission speed, the detector output will have a latency equal to the path memory depth.

MLSD has the potential to achieve highly accurate sequence detection, but as the modulation scheme increases the number of symbol values above 2-PAM (binary), or the number of ISI terms increases beyond 2, the number of combinations to be calculated at each unit interval of time increases exponentially. A potentially less complex alternative to MLSD is Reduced-State Sequence Detection (RSSD). This technique is described in detail by M. V. Eyuboglu and S. U. Qureshi in "Reduced-State Sequence Estimation with Set Partitioning and Decision Feedback," IEEE Trans. On Communications, Vol. 36, No. 1, pp. 13-20, January 1988. RSSD reduces the number of states used in sequence detector, thereby reducing the number of calculations required under the Viterbi Algorithm during each unit interval (UI) of the received signal. However, this reduction in calculation complexity introduces ambiguity that must be resolved through other means.

In RSSD, selected states of the trellis diagram of the MLSD are partitioned into new states (sometimes called "hyper-states") to convert the trellis diagram into a trellis diagram with fewer number of states, hence fewer state metrics to be calculated. As a result of this state partitioning, the branches that fall inside the same partition (i.e., both start and end states belong to the same partition) will have to merge to a single branch. Each branch could represent either a transition caused by a different symbol or a different memory trace-back, or both. Accordingly, the ambiguities resulting from state partitioning have to be resolved at some point in order to ultimately achieve proper detection.

The general solution to the resolution of these ambiguities is to employ a feedback mechanism that works in conjunction with the RSSD detector. This feedback mechanism essentially behaves like a DFE detector that, along with the RSSD detector, can complete the task of detection. An example of such a hybrid structure is illustrated in FIG. 5(A) and FIG. 5(B).

FIG. 5(A) shows an F-state MLSD sequence detector trellis 502 used to generate estimated symbols 506 based on received samples 504. This F-state detector trellis 502 illustrates a full-state sequence detector, i.e. as an MLSD.

FIG. 5(B) shows a hybrid Reduced-State Sequence Detector (RSSD) system 510 comprising an R-state sequence detector 512 and a decision feedback loop 514. In this example, R<F, showing that RSSD can accomplish detection using a reduced number of states relative to the full F-state MLSD implementation 502. Like an MLSD, the RSSD 510 also generates estimated symbols 516 based on received samples 518.

The R-state sequence detector 512 provides estimated symbols 520 as feedback to the loop 514. This estimated symbol set 520 is fed through a delay chain 522; the delayed symbol set 524 is then weighted by a weight vector 525 similar to what was described in the DFE example above to produce a quantity 526 to be subtracted from the received samples 504 similar to the DFE example above. FIG. 5(B) and the above explanation demonstrate the resemblance of the RSSD feedback loop to that of a regular DFE.

The combination of the reduced-stated sequence detector (e.g. R-state detector 512) and the decision feedback loop connected to it (e.g. feedback loop 514) behaves like a hybrid detector performing somewhere between the performance lines of a full state MLSD and a regular DFE. For this reason, the resulting RSSD is sometimes called a Decision Feedback Sequence Detector (DFSD) or equivalently, a Decision Feedback Sequence Estimator (DFSE). The degree to which the performance is closer to each end of the spectrum of MLSD to DFE depends on the extent of state partitioning. If a greater number of states are placed in one partition, more deviation from the full state MLSD results, and the performance becomes closer to the performance of a DFE. The extreme case of partitioning all the states of an MLSD into one single group converts the MLSD into a regular DFE, as shown by the present inventor, M. H. Shakiba, in "Analog Viterbi Detection for Partial-Response Signaling," Ph.D. Dissertation, Department of Electrical and Computer Engineering, University of Toronto, 1997 (hereinafter the "Shakiba Dissertation"), which is hereby incorporated by reference in its entirety.

Due to implementation complexity challenges, sequence detection (MLSD or even RSSD) has not historically been widely used in high-speed data communication systems (such as data communication over backplanes). Given the ever-increasing need for higher data rates while achieving the performance requirements of the system, there exists a need for sequence detection systems having reduced complexity relative to known MLSD and RSSD techniques for use in high speed data communication applications.

SUMMARY OF THE INVENTION

In at least some embodiments, the present disclosure addresses the technical problem of the speed bottleneck of reduced state sequence detection (RSSD). This bottleneck problem is introduced by the use of a decision feedback loop to resolve hyper-states: the decision feedback loop is dependent on the output of the RSSD process to make its own decision calculations, thereby creating a long feedback loop that contains the entire RSSD process in its critical path. In at least some embodiments, the problem is addressed by using decision feed-forward in place of decision feedback, thereby eliminating the dependence of the decision loop on the output of the RSSD process.

In accordance with an embodiment, a sequence detector is disclosed. The sequence detector is for detecting a sequence of symbols corresponding to a transmitted sequence of symbols in accordance with a sequence of samples received. The detector comprises a slicer for generating a binned representation of a combination of a weighting factor and a set of samples from the received sequence, a memory element for providing a delayed version of the output of the slicer as an input to control selection of the weighting factor, and a reduced-state sequence detector (RSSD) comprising a branch metric calculator, a state metric calculator and a path memory. The branch metric calculator receives as an input the received sequence of samples, the output of the slicer, and a fed forward output of the memory element. The state metric calculator receiving as an input the output of the branch metric calculator. The path memory generates a set of estimated symbols in accordance with output of the state metric calculator and the received sequence of samples.

In accordance with another embodiment, a method for detecting a sequence of symbols is disclosed. The sequence of symbols corresponds to a transmitted sequence of symbols in accordance with a sequence of samples received. The method comprises combining a weighting factor and a set of samples from the received sequence; generating a binned representation of the combination of the weighting factor and the set of samples using a slicer; selecting the weighting factor based on a delayed version of the output of the slicer; calculating one or more branch metrics for a reduced state sequence detection (RSSD) algorithm based on the received sequence of samples, the output of the slicer, and the output of the memory element; calculating one or more state metrics for the RSSD algorithm based on the output of the branch metric calculator; and generating a set of estimated symbols based on the one or more state metrics and the received sequence of samples.

Further example embodiments of the claimed subject matter will be appreciated from the following detailed description and drawings.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for decision feed-forward reduced-state sequence detection (DFF-RSSD) used to detect sequences of symbols received over a communication link or channel. By using decision feed-forward in place of decision feedback, the speed bottleneck introduced to RSSD will be improved in some applications. Described embodiments may provide appreciable simplification to the concern of implementation complexity of a sequence detector, which has historically been either a challenge or even a barrier to the employment of the sequence detection scheme in several data communication systems, particularly at high speeds. The simplifications may in some embodiments be built on top of known techniques to reduce complexity and may be achieved with little to no additional degradation in the performance of the detector.

An example communication link will first be described to illustrate baseline examples of MLSD and RSSD, thereby providing context for the present illustrative embodiments. In this example communication link, some known ISI is intentionally added to the signal to illustrate the operation of MLSD and/or RSSD.

Consider a communication link in which the transmitted symbols are 4-PAM (4-level pulse amplitude modulation) symbols, i.e. the signal uses a modulation scheme using four symbols corresponding to four signal values. The 4-PAM symbols with values −1, −⅓, +⅓, and +1, and the received signal has undergone the transformation expressed by the discrete transfer function $(1+z^{-1})$. This transfer function is often called a "Duobinary polynomial": it adds one single ISI term by adding the previous symbol (designated by the "$z^{-1}$" term) to the current symbol (the "1" term).

Figure 1:
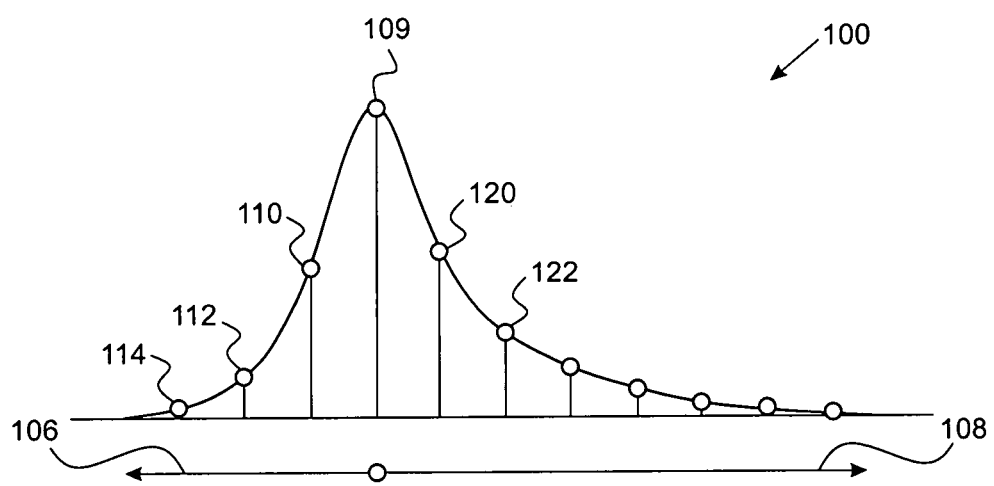
FIG. 1 is a plot of an example signal showing signal pre-cursor and post-cursor dispersion into previous and next symbols, as known in the art.
Figure 2:
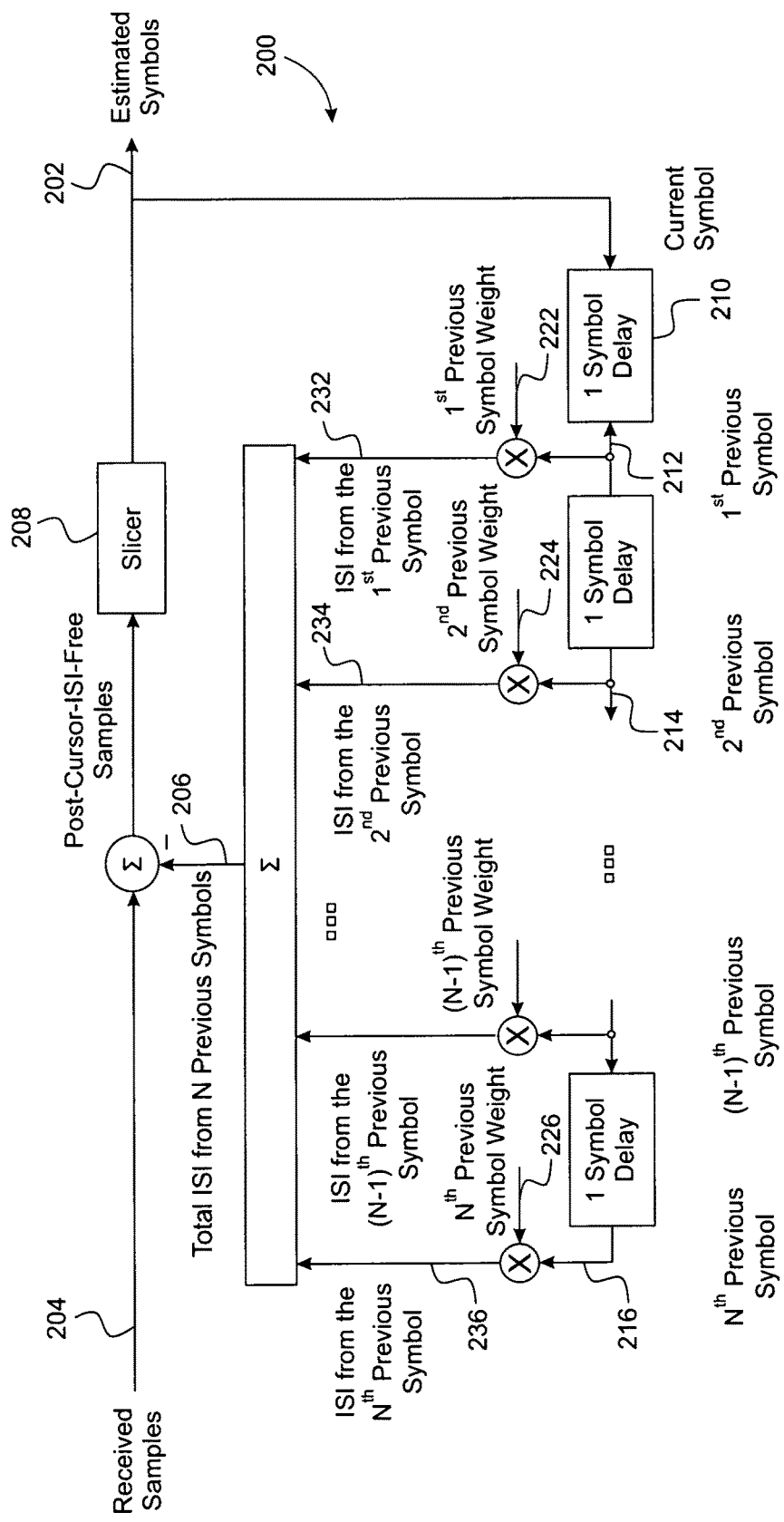
FIG. 2 is a block diagram of an example decision feedback equalizer (DFE) for cancelling inter-signal interference (ISI), according to the prior art.
Figure 3:
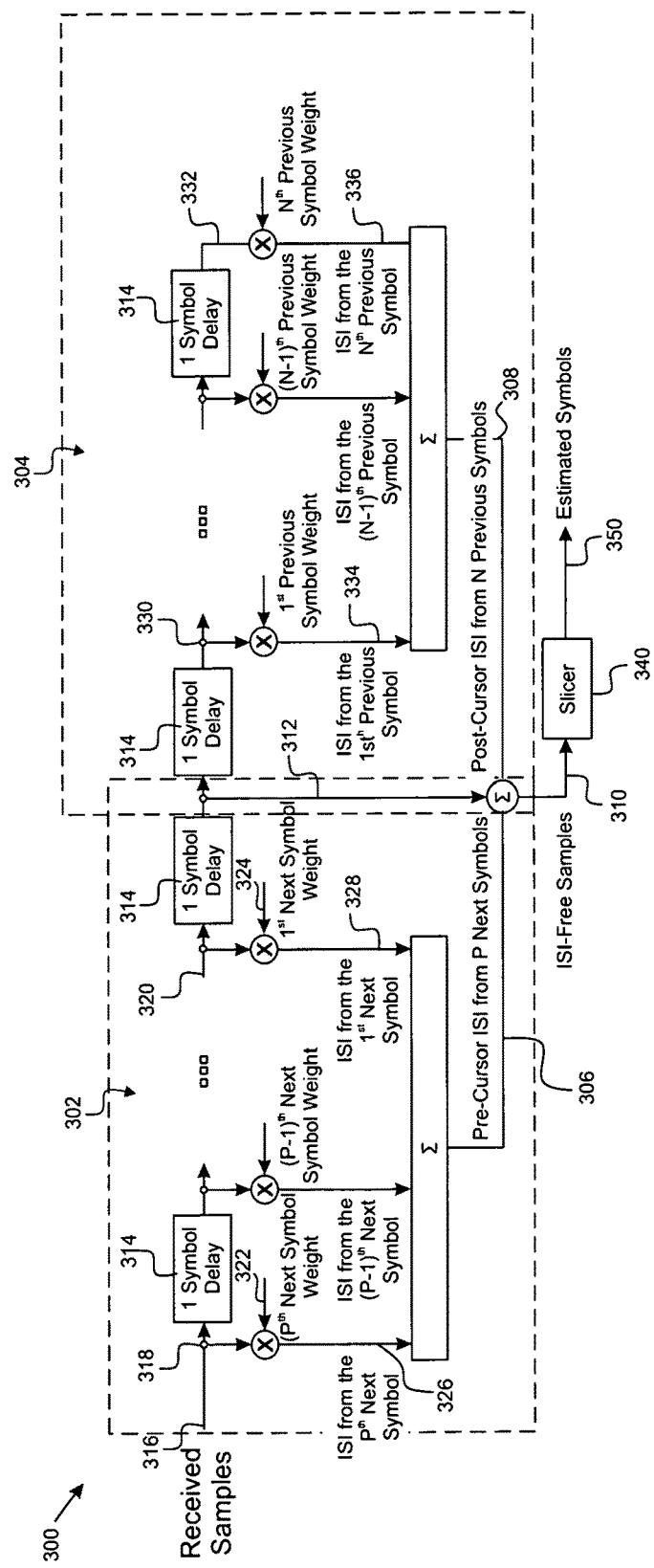
FIG. 3 is a block diagram of an example feed forward equalizer (FFE) for cancelling inter-signal interference (ISI), according to the prior art.
Figure 4:
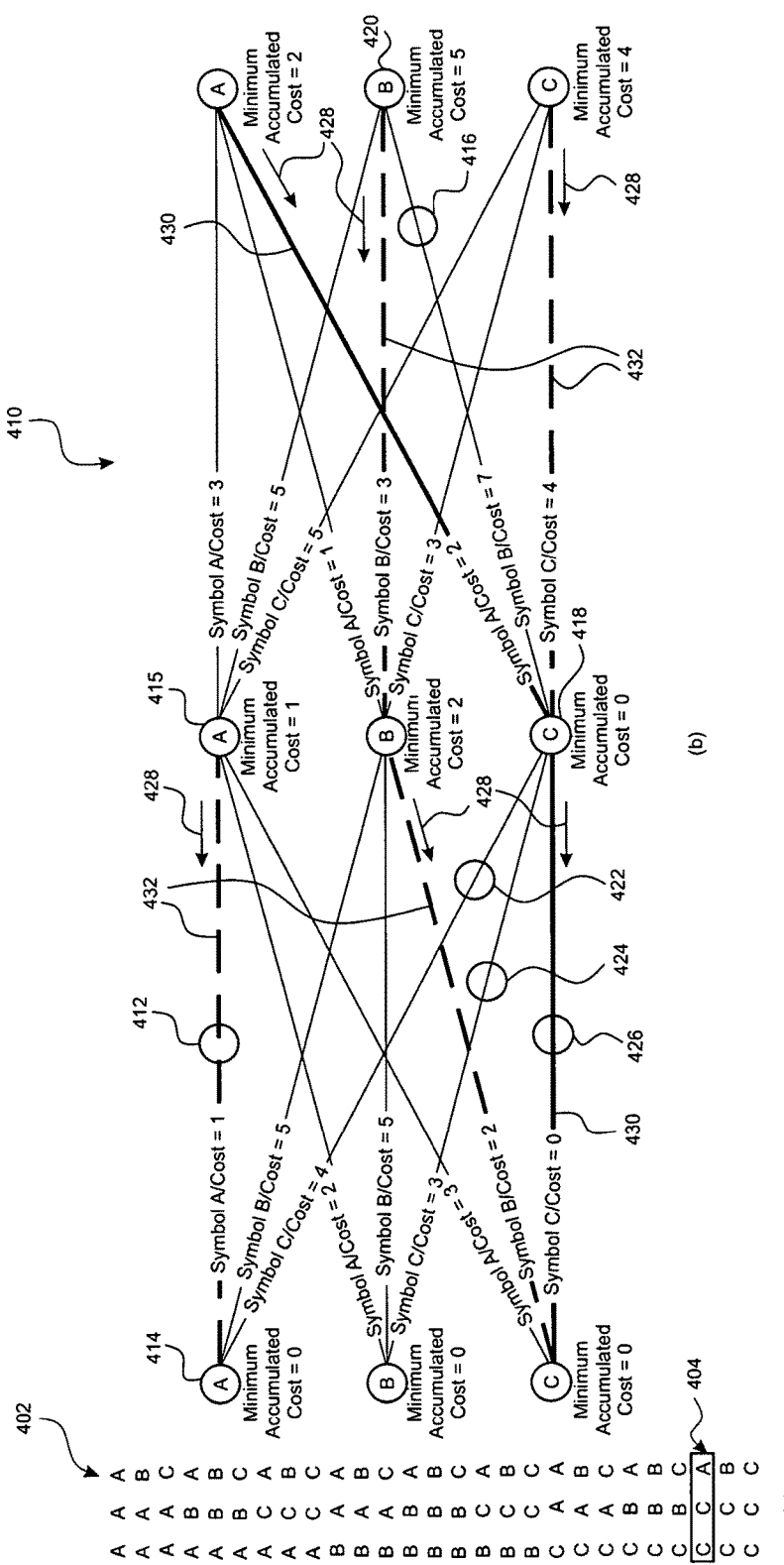
FIG. 4 is a table of all possible three-symbol sequences in an example three-symbol-value encoding scheme, along with an example MLSD trellis showing all possible transitions between the symbols in the sequence and associated branch metrics, according to the prior art.
Figures 5A, 5B:
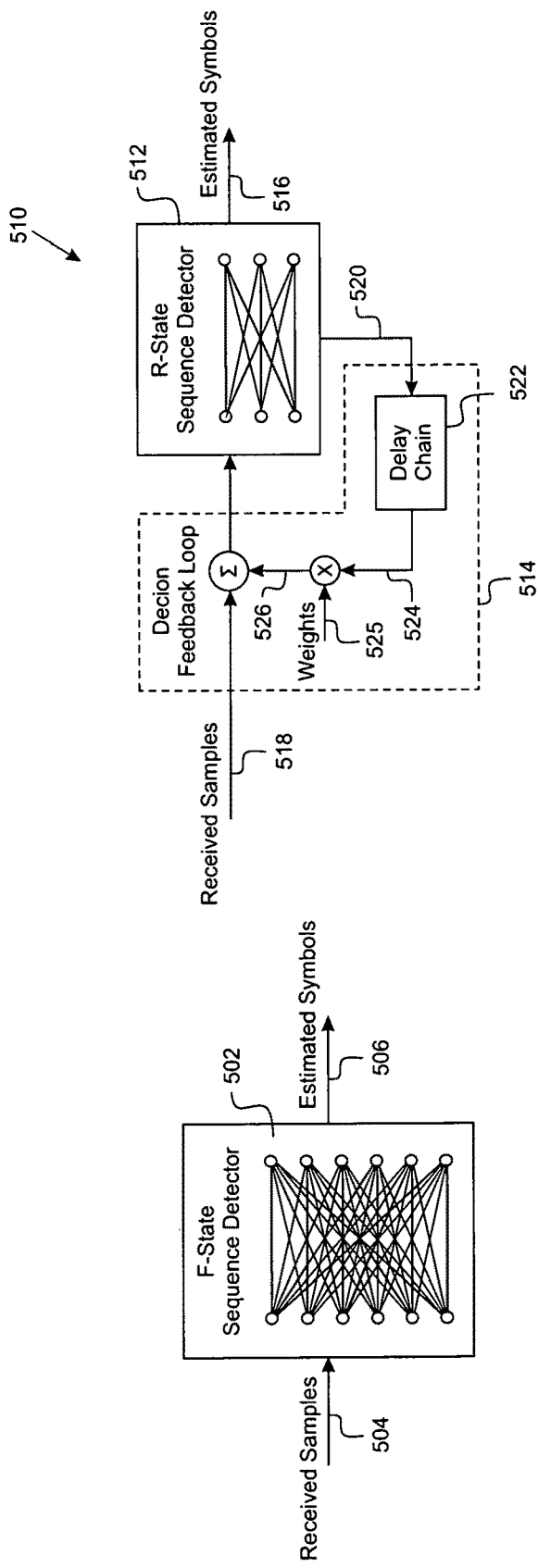
FIG. 5(A) is a block diagram of an F-state MLSD trellis according to the prior art.
FIG. 5(B) is a block diagram of a RSSD system using an R-state sequence detector in conjunction with a decision feedback loop, according to the prior art.
Figure 6A:
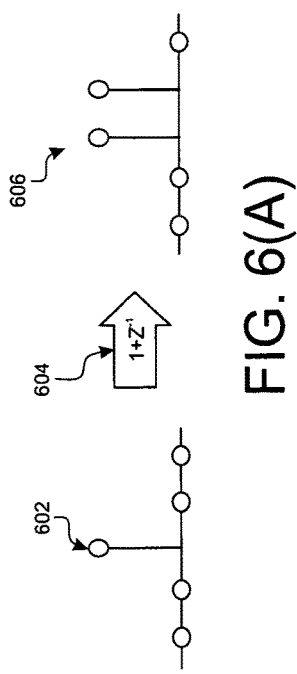
FIG. 6(A) is plot of a transmitted impulse signal showing the application of an example transfer function $(1+z^{-1})$ to yield an impulse response, according to described examples.

FIG. 6(A) shows the impulse response of the Duobinary polynomial. A transmitted signal 602 having a single impulse (symbol values . . . , 0,0,1,0,0, . . . ), transmitted over the sample communication link with the transfer function 604 $(1+z^{-1})$, produces a received signal 606 with values ( . . . , 0,0,1,1,0, . . . ), representing the transmitted signal 602 ( . . . , 0,0,1,0,0, . . . ) plus the added ISI created by the $z^{-1}$ term ( . . . , 0,0,0,1,0, . . . ).

In the example 4-PAM modulation scheme described above, the same communication link with transfer function 604 $(1+z^{-1})$ produces a response having one of the seven values −2, −4/3, −⅔, 0, +⅔, +4/3, and +2, in response to the transmitted 4-PAM symbols. The task of the detector on the receiver side is to recover the original levels of the four-level symbols of the transmitted 4-PAM signal from the seven levels of the received signal, keeping in mind that the received signal is typically comprised of a combination of the transmitted signal and noise (usually Additive, White, Gaussian Noise (AWGN)).

Figure 6B:
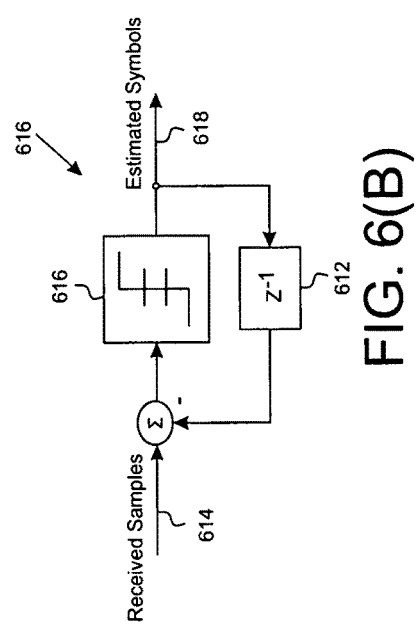
FIG. 6(B) is a block diagram of a 1-tap DFE loop to illustrate ISI removal for the transfer function $(1+z^{-1})$ of FIG. 6(A), according to described examples.
Figure 6C:
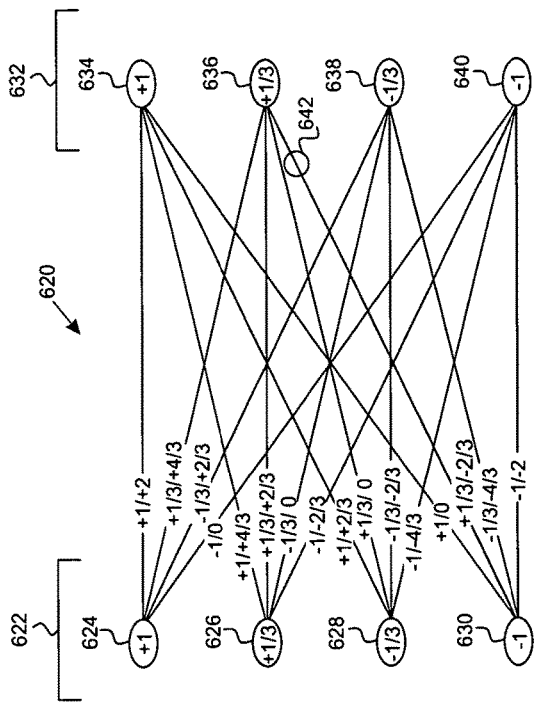
FIG. 6(C) is a diagram of a 4-state MLSD trellis using an example 4-PAM modulation scheme according to described examples.

Three options for detecting this signal are compared in FIG. 6(A) through 6(D): DFE, MLSD, and RSSD. FIG. 6(B) illustrates an example DFE system; FIG. 6(C) illustrates a trellis diagram corresponding to the 4-state MLSD of FIG. 6(D); and FIG. 7(A) depicts a 2-hyper-state trellis diagram corresponding to the 2-state RSSD detector of FIG. 7(B).

The DFE detection system 610 in FIG. 6(B) is a 1-tap DFE with the tap coefficient equal to 1 (i.e., the weight applied to the $1^{st}$ previous symbol is 1 or 100%. By subtracting 100% of the previous symbol value ($z^{-1}$) stored at the single tap 612, the ISI term $z^{-1}$ is removed from the received samples 614 before the signal passes through a slicer 616 to produce estimated symbols 618.

The MLSD trellis 620 shown in FIG. 6(C) is a 4-state trellis diagram (corresponding to the four levels of the 4-PAM signal and one ISI term from the coding polynomial) in which each state can transition to any other state of the next step based on the input at that step, and produces one of the seven received signal levels in response to this transition. The MLSD detector corresponding to this trellis 620 is a straight-forward implementation of the Viterbi algorithm (described above) that finds the most likely sequence of symbols that can represent the transmitted sequence of symbols in the noisy environment of the communication channel. In the presence of AWGN, the branch metrics are in this example evaluated based on the mean-square error criterion, and the overall objective of the MLSD is to find the path along which the cumulative error is minimum.

Thus, at time step zero 622 the states of the trellis are +1 624, +⅓ 626, −⅓ 628, and −1 630, and similarly at time step one 632 the states of the trellis are +1 634, +⅓ 636, −⅓ 638, and −1 640. The branch metric for transitioning from a given state at time step zero 622 to any given state at time step one 632 is calculated by first determining the expected value that would result from this transition. This is achieved by applying the transfer function $1+z^{-1}$ to the input level that causes the transitions to the new state at time step one 632 (as term 1) and the state value at time step zero 622 (as term $z^{-1}$). Thus, for example, the transition from state −1 630 at time step zero 622 to state +⅓ 636 at time step one 632 gives an expected value equal to (+⅓+(−1))=(−⅔). To calculate the cost penalty of the transition 642 from −1 630 at time step zero 622 to +⅓ at time step one 632 using the mean square error metric, one would subtract (−⅔) from the value of the received signal at time step one 632 and square the result. This would produce a cost penalty for transition 642, which would be used together with all other calculated cost penalties of each other transition to implement the remainder of the steps of the Viterbi algorithm described above. For example, if the received signal value at time step one were equal to (0.1), the error would be (0.1—(−⅔))=(0.7667), and the square error would be $(0.7667)^2$=0.5878. Thus, the value of 0.5878 would be used as the cost penalty for this transition. Similarly, to calculate the cost penalty of the transition from −⅓ 628 to +⅓ 636, one would first calculate the expected value (+⅓+(−⅓))=0. One would then subtract this from the received value (0.1) and square the result, yielding a square error cost penalty of $(0.1-0)^2$=0.01. In this example, and assuming time step zero corresponds to the start of the Viterbi algorithm from a zero initial condition, the transition from −1 630 to +⅓ 636 would be discarded as a possible branch in the signal path because its branch metric of 0.5878 is not the lowest metric of all the branches leading to +⅓ 636 (i.e., we know that at least one such branch, from −⅓ 628 has a lower metric of 0.01). Also, state metric of state +⅓ would be updated to its new accumulated value of (state metric at time step 0+branch metric of the surviving transition)=(0+0.01)=0.01. Similarly, the new state metric values are calculated for other three states. For each consecutive next time step, time step zero and one advance by one step (time step zero becomes time step one and time step one becomes time step two) and the algorithm proceeds with new branch metric calculations as well as new accumulated state metric calculations. From the path information that resulted in the new updated values for the state metrics the survivor paths are determined and saved in a path memory location. The path memory content will be traced back after a waiting time (latency), as explained before, to decide on the detected symbols.

In other examples, the error metric used may be something other than mean square error, such as absolute error, in which case the absolute value |(0.1−(−⅔))|=0.7667 would be used as the cost penalty for transition 642.

Figure 6D:
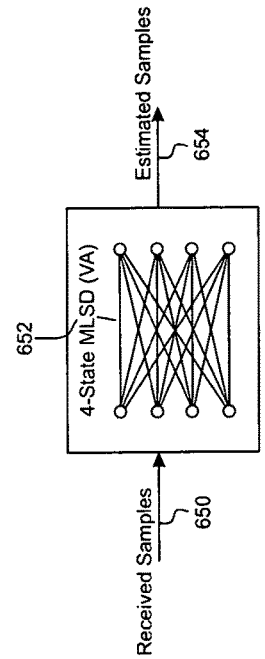
FIG. 6(D) is a block diagram of a 4-state MLSD detector according to described examples.
Figure 7A:
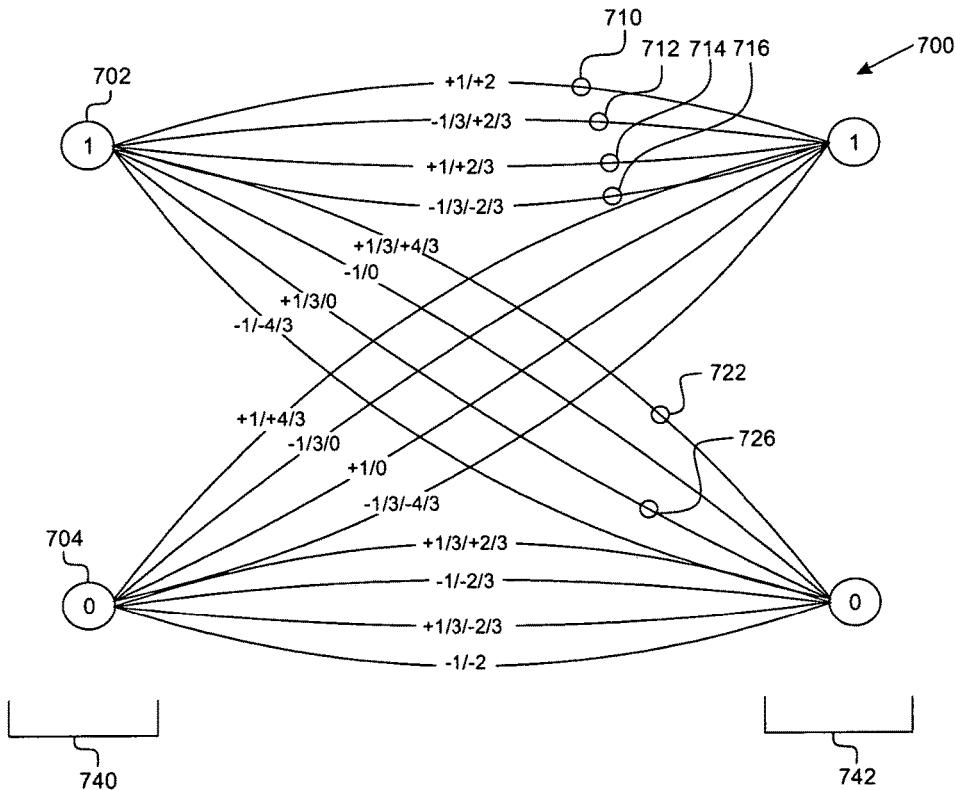
FIG. 7(A) is a diagram of a 2-hyper-state RSSD trellis according to described examples.

The example 4-PAM MLSD trellis 620 of FIG. 6(C) is illustrated in FIG. 6(D) with received samples 650 being used as input to the MLSD 620 to produce estimated symbols 654.

Figure 7B:
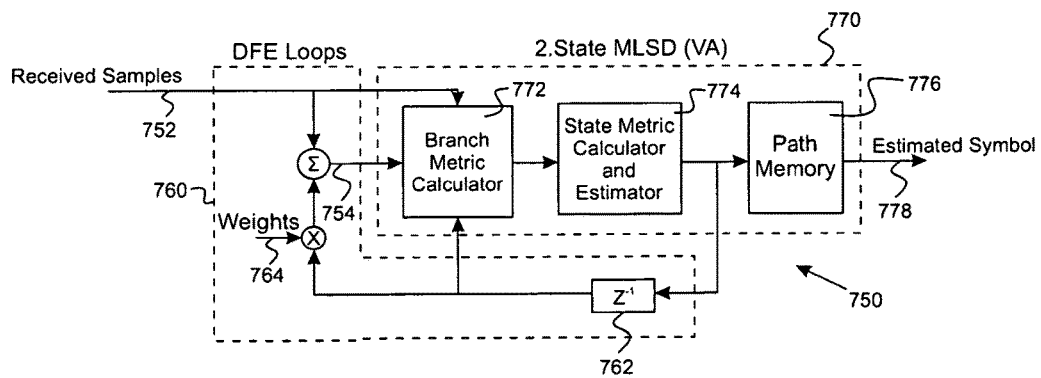
FIG. 7(B) is a block diagram of a hybrid RSSD detector using a decision feedback loop in conjunction with a 2-state MLSD detector according to described examples.

FIGS. 7(A) and 7(B) show a 2-hyper-state trellis 700 corresponding to a 2-hyperstate RSSD detector 770. The RSSD detector 770 is a reduced-state version of the 4-state MLSD 620 described above and shown in FIGS. 6(C) and 6(D). The RSSD's 2-hyper-state trellis 700 has two hyper-states, 1 702 and 0 704. The hyper-state 1 702 corresponds to 4-PAM MLSD states +1 624 and −⅓ 628, while the hyper-state 0 704 corresponds to 4-PAM MLSD states +⅓ 626 and −1 630. In some embodiments, it may be preferable to group (or "partition") non-adjacent/non-neighbouring states together into a single hyper-state (e.g. +1 and −⅓, rather than +1 and +⅓): this may assist with the performance of the RSSD detector as described by S. Olcer in "Reduced-State Sequence Detection of Multilevel Partial-Response Signals," IEEE Transactions on Communications, Vol. 40, No. 1, January 1992.

It's been shown that the 4-PAM MLSD detector 620 of FIGS. 6(C) and 6(D) can be reduced to the 2-state RSSD detector 770 of FIG. 7(B) with little performance penalty: see, e.g., M. H. Shakiba, "Analog Viterbi Detection for Partial-Response Signaling," Ph.D. Dissertation, Department of Electrical and Computer Engineering, University of Toronto, 1997 (hereinafter the "Shakiba Dissertation"), which is hereby incorporated by reference in its entirety.

To achieve this, states −1 630 and +⅓ 626 are combined into a single hyper-state 0 704 and states +1 624 and −⅓ 628 are combined into a single hyper-state 1 702. This partitioning reduces the 4-state trellis diagram 620 to a 2-state trellis diagram 700 with four parallel branches between each two hyper-states (e.g. branches 710,712,714,716 between hyper-state 1 702 at time step zero 740 and hyper-state 1 702 at time step 742).

The parallel branches (e.g. branches 710,712,714, and 716) are the result of state partitioning and will be resolved (i.e. disambiguated) during symbol detection by the help from a decision feedback mechanism (such as decision feedback loop 760 in FIG. 7(B)). Assuming that at the end of each step (e.g. time step one 742), estimates of the previous states are available (i.e. the original states have been estimated or disambiguated within each hyper-state), two of every one of the four parallel branches can be discarded. (Thus, in example two-time-step RSSD trellis 700, assuming that a 4-PAM symbol value of +1 has been estimated for hyper-state 1 702 at time step zero 740, then branches 712 and 716 can be discarded, as can branches 722 and 726). This is due to the fact that once the originating states are known, there will only be two transitions (out of four) to each other state of the next step.

However, yet another decision needs to be made to reduce the number of parallel branches from two to one, so that the 2-state sequence detector can proceed without further ambiguity. It has been shown (by the present inventor M. H. Shakiba in the Shakiba Dissertation, supra) that this second decision can be made by slicing the input signal in another decision feedback loop that adjusts the input signal level based on the same previous state estimates. Such a combined hybrid RSSD detector 750 is illustrated in FIG. 7(B), in which the 2-state sequence detector 770 is divided into its main operations of branch metric calculation 772, state metric calculation and estimation 774, and path memory 776.

Given the example two hyper-state RSSD detector 770, the example decision feedback loop 760 needs to store and carry forward two disambiguated states at each time step to be used in the next time step. The values of these previous states are weighted by a weight vector 764 to produce a quantity 726 to be subtracted from the received sample 752. The adjusted output 754 of this subtraction is fed into the branch metric calculator 772 along with the un-corrected received sample 752 and the estimated previous state or states stored in the memory tap 762. These three values are used by the RSSD detector 770 to resolve or disambiguate between the two remaining parallel branches within the hyper-state (e.g. 710 and 714): the estimate produced by the decision feedback loop 760 is used as the more likely of the two remaining branches. Once the parallel branches are disambiguated, the 2-state sequence detector 770 can calculate the branch and state metrics and proceed to path memory update and eventually generate estimated symbol 778.

Figure 8:
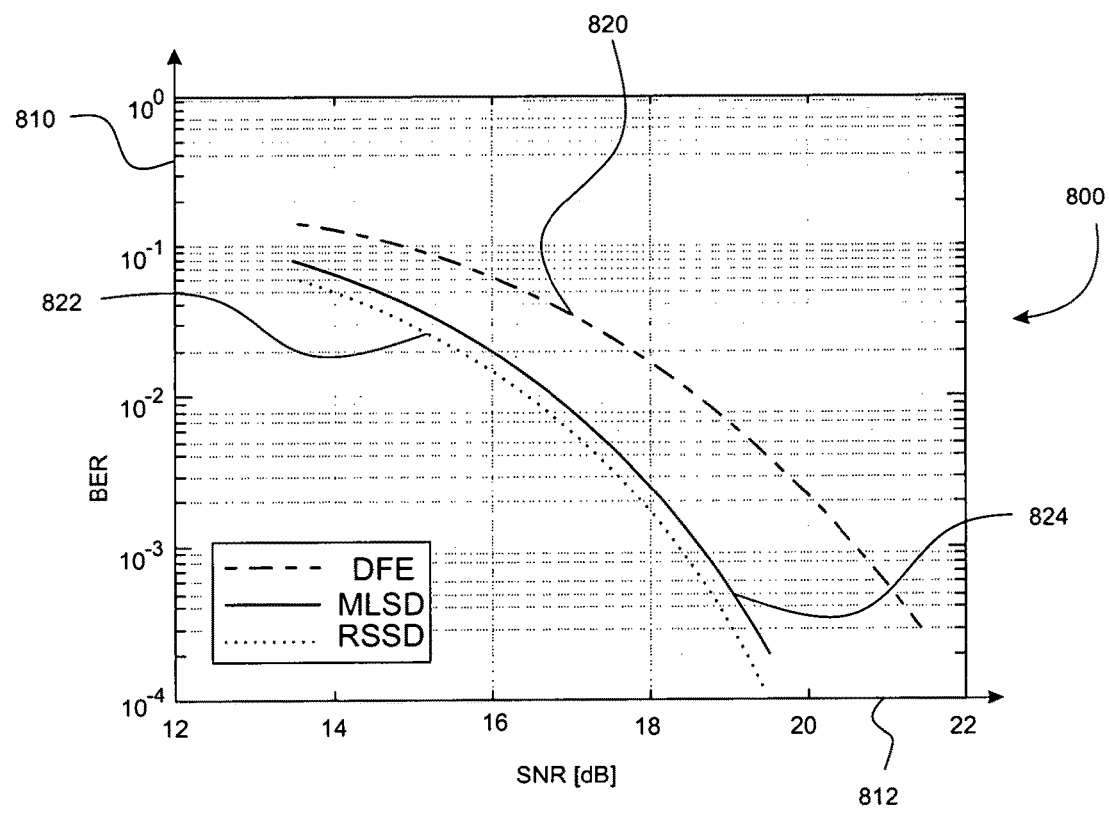
FIG. 8 is a plot of the bit error rate (BER) performance of example DFE, MLSD, and hybrid RSSD detectors plotted against signal-to-noise ratio (SNR).

As a result of the decision feedback loop 760, the performance of the hybrid RSSD 750 is degraded relative to the original MLSD detector 620, but is still better than the regular DFE 610 due to the partial operation of the 2-state sequence detector 770. FIG. 8 shows a plot 800 of the simulated Bit-Error Rate (BER) performance (shown as the vertical axis 810) of the example hybrid RSSD detector 750 as a function of its input Signal-to-Noise Ratio (SNR). In this example, Gray coding (i.e. reflected binary coding) is used during level modulation. SNR (shown as the horizontal axis 812) is defined as the ratio of the input signal's average power to the variance of the zero-mean AWGN noise, expressed in dB. BER results for a regular DFE 820 and a full-state MLSD 822 are also shown for comparison to the BER of the hybrid RSSD 824. As expected, the RSSD 824 performs in-between its two limits 820 and 822; in this case, its performance is closer to that of the MLSD 822 due to optimum state partitioning.

One potential limitation of hybrid RSSD detectors as described above is the decision feedback loop timing closure requirement. The state reduction technique (i.e. partitioning states into a smaller number of hyper-states) is successful in reducing the complexity of the sequence detector, but it comes with a side effect: there is now a decision feedback loop that includes the Viterbi algorithm, and the operations within this loop must be completed in one time step cycle. This timing closure requirement limits the operation speed of the RSSD, with the length of the feedback loop being a severe limiting factor. Described herein are example embodiments that address the loop timing closure requirement.

The timing requirement problem of RSSD can be removed or alleviated if the decision feedback loop (e.g. loop 760) is avoided or minimized to a small and fast loop that does not depend on the decisions of the sequence detector (e.g. 2-state detector 770), but instead provides disambiguation information while the operation of the sequence detector is ongoing. The system described in the Shakiba Dissertation, supra is a move in this direction. It shows that for the particular case of the transfer function $(1-z^{-1})$ applied to 4-PAM symbols, the sequence detection can be broken into several scenarios. The scenarios are results of binning the input signal (i.e. grouping signal values by slice level cutoffs) using slicers with slice levels that depend on the different values of the feedback signal.

It then demonstrates that any of these scenarios will fall into one of two major categories. The first category ("Category I") encompasses scenarios where the next step decisions can be made without the need for the completion of the sequence detection, essentially achieving the above goal. Category 1 scenarios may thus be referred to herein as "unambiguous" or as denoting "unambiguous hyper-state outcomes". However, the scenarios of the second category ("Category 2") still require the results of the sequence detector. Category 2 scenarios may thus be referred to herein as "ambiguous" or as denoting "ambiguous hyper-state outcomes". By doing this, the technique described in the Shakiba Dissertation, supra shows how simplifications can be made to the implementation of the RSSD. However, it does not entirely solve the timing requirement of the feedback, since as a whole the RSSD detector still relies on the availability of the sequence detector results to resolve the Category 2 scenarios.

The following examples make use of a generalized version of the basic Duobinary polynomial: rather than using the $(1-z^{-1})$ 4-PAM example given above, these examples use a $(1+\alpha z^{-1})$ polynomial ($0<\alpha\leq 1$), which is a generalized version of Duobinary, applied to 4-PAM symbols. The $(1+\alpha z^{-1})$ polynomial is chosen because its low-pass frequency response is more relevant to data communication applications, where the communication channel also has a low-pass response. This is simply an illustrative example; the example embodiments can be applied equally to communication links or channels having other transfer functions and other polynomials.

Figure 9:
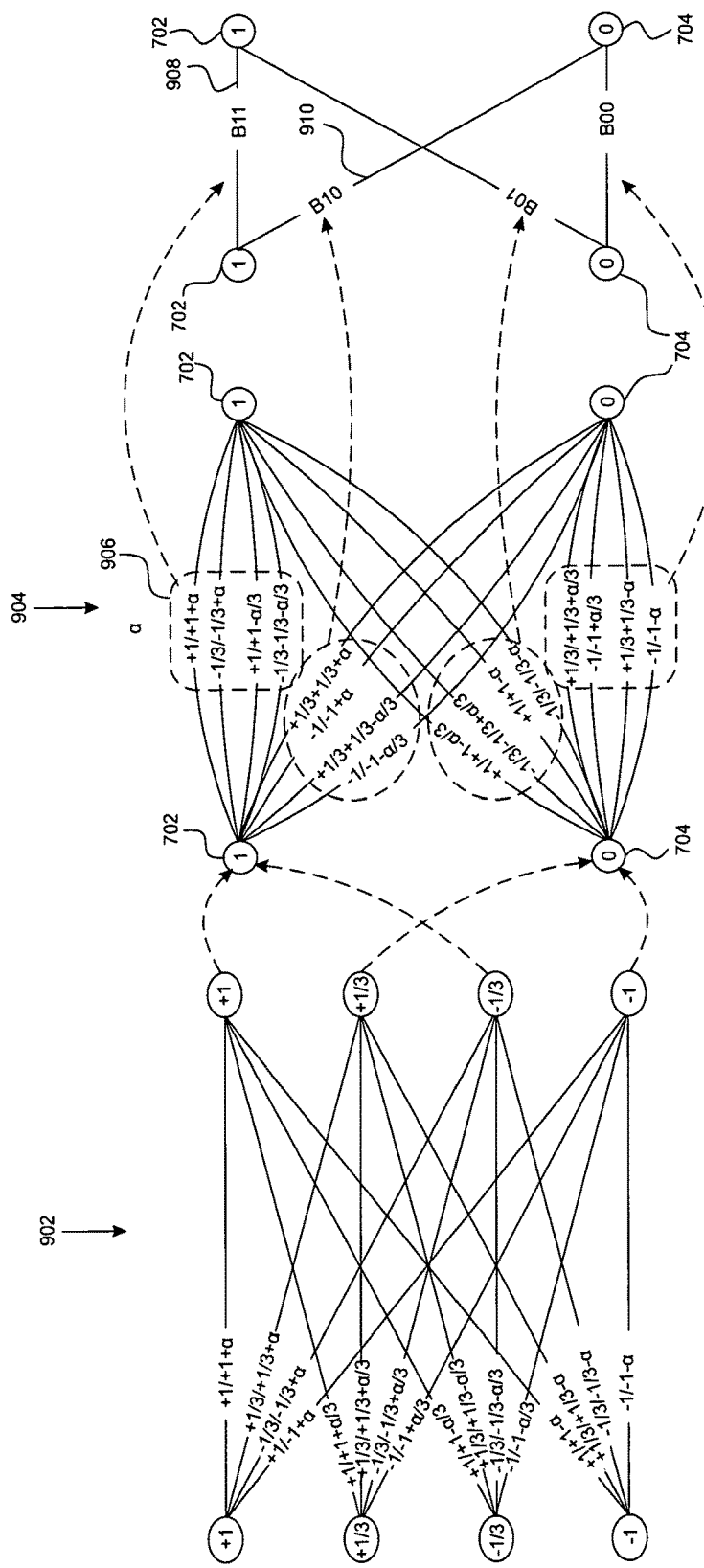
FIG. 9 is a diagram showing state reduction transformation of a 4-state MLSD trellis to a 2-hyper-state RSSD trellis and then to a 4-branch-metric RSSD trellis according to described examples.

The operation of the technique described in the Shakiba Dissertation, supra on the generalized Duobinary transfer function with 4-PAM signaling is illustrated in FIG. 9 and in Tables 1.A to 1.0 below.

Using the $(1+\alpha z^{-1})$ polynomial with the 4-PAM modulation scheme described above (with symbol levels $-1$, $-\frac{1}{3}$, $+\frac{1}{3}$, and $+1$) yields the three-step technique described below.

First, as shown in FIG. 9, the 4-state MLSD trellis diagram 902 is constructed by applying transfer function $(1+\alpha z^{-1})$ to 4-PAM signal levels of $-1$, $-\frac{1}{3}$, $+\frac{1}{3}$, and $+1$. The 4-state trellis diagram is then transformed during state reduction to a 2-hyper-state trellis 904. This transformation uses the same state partitioning that was explained and used in the previous example of the $(1-z^{-1})$ transfer function that converted the 4-state trellis diagram of FIG. 6(C) to the two-state trellis diagram of FIG. 7(A). As a result of this state reduction, four groups of four branches associated with the grouped states form four sets of parallel branches that connect hyper-states of the 2-state trellis diagram. The 2-hyper-state trellis 904 is then simplified, with each four-some of parallel branches (e.g. foursome 906 transitioning from hyper-state 1 702 at time step zero to hyper-state 1 702 at time step one) designated by a single transition designator (in this example, the transition from hyper-state 1 702 to hyper-state 1 702 is designated "B11" 908, from hyper-state 1 702 to hyper-state 0 704 as "B10" 910, and so on). Each such transition designator (e.g. B11 908 or B10 910) corresponds to a branch metric for the 2-hyper-state trellis 904. Recall that similar to the previous 4-PAM Duobinary example, the ambiguities resulting from this state grouping will be resolved by the decision feedback that wraps around the reduced-state detector.

Second, after the state partition is resolved, the state estimates will be one of three possible outcomes (out of a total of four): these three outcomes are designated Outcome A, Outcome B, and Outcome C. Outcome A corresponds to hyper-state 0 704 resolving to state $-1$ 630 and hyper-state 1 702 resolving to state $-\frac{1}{3}$ 628. Outcome B corresponds to hyper-state 0 704 resolving to state $+\frac{1}{3}$ 626 and hyper-state 1 702 resolving to state $-\frac{1}{3}$ 628. Outcome C corresponds to hyper-state 0 704 resolving to state $+\frac{1}{3}$ 626 and hyper-state 1 702 resolving to state $+1$ 624. (Note that there is no Outcome D, which would correspond to hyper-state 0 704 resolving to state $-1$ 630 and hyper-state 1 702 resolving to state $+1$ 624: these two states ($-1$ 630 and $+1$ 624) are too far apart in value for these two estimates for the hyper-state resolutions to mathematically coincide in the case of any given measured signal value.)

Third, the algorithm starts from one of the above state outcomes (Outcome A, B, or C) at the beginning of each step of the algorithm iteration. Input signal bins, branch metric assignments, and resulting state Outcome at the end of that step are set out in Tables 1.A, 1.B, and 1.C, corresponding to the starting outcomes A, B, and C, respectively. In these tables, y[k] represents the received input sample at time step k.

TABLE 1.A

Direct Application of "Shakiba Dissertation, supra" to $1 + \alpha z^{-1}$ 4-PAM DF-RSSD
When Starting from State Outcome A (Hyper-State 0 = State − 1 and Hyper-State 1 = State − ⅓)
($C = +2\alpha/3$)

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} + \frac{\alpha}{3} < y[k] + C$ | $\left(+\frac{1}{3} - \alpha - y[k]\right)^2$ | $(+1 - \alpha - y[k])^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |
| $+\frac{1}{3} - \frac{\alpha}{3} < y[k] + C < +\frac{1}{3} + \frac{\alpha}{3}$ | | | | $\left(-\frac{1}{3} - \frac{\alpha}{3} - y[k]\right)^2$ | Outcome B or Outcome C (Category 2) |
| $-\frac{1}{3} + \frac{\alpha}{3} < y[k] + C < +\frac{1}{3} - \frac{\alpha}{3}$ | | $\left(-\frac{1}{3} - \alpha - y[k]\right)^2$ | | | Outcome B (Category 1) |
| $-\frac{1}{3} - \frac{\alpha}{3} < y[k] + C < -\frac{1}{3} + \frac{\alpha}{3}$ | | | $\left(-1 - \frac{\alpha}{3} - y[k]\right)^2$ | | Outcome A or Outcome B (Category 2) |
| $y[k] + C < -\frac{1}{3} - \frac{\alpha}{3}$ | $(-1 - \alpha - y[k])^2$ | | | | Outcome A (Category 1) |

TABLE 1.B

Direct Application of "Shakiba Dissertation, supra" to $1 + \alpha z^{-1}$ 4-PAM DF-RSSD
When Starting from State Outcome B (Hyper-State 0 = State + ⅓ and Hyper-State 1 = State − ⅓)
($C = 0$)

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} + \frac{\alpha}{3} < y[k] + C$ | $\left(+\frac{1}{3} + \frac{\alpha}{3} - y[k]\right)^2$ | $\left(+1 + \frac{\alpha}{3} - y[k]\right)^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |
| $+\frac{1}{3} - \frac{\alpha}{3} < y[k] + C < +\frac{1}{3} + \frac{\alpha}{3}$ | | $\left(-\frac{1}{3} + \frac{\alpha}{3} - y[k]\right)^2$ | | | Outcome B or Outcome C (Category 2) |
| $-\frac{1}{3} + \frac{\alpha}{3} < y[k] + C < +\frac{1}{3} - \frac{\alpha}{3}$ | | | | $\left(-\frac{1}{3} - \frac{\alpha}{3} - y[k]\right)^2$ | Outcome B (Category 1) |
| $-\frac{1}{3} - \frac{\alpha}{3} < y[k] + C < -\frac{1}{3} + \frac{\alpha}{3}$ | $\left(-1 + \frac{\alpha}{3} - y[k]\right)^2$ | | | | Outcome A or Outcome B (Category 2) |
| $y[k] + C < -\frac{1}{3} - \frac{\alpha}{3}$ | | | $\left(-1 - \frac{\alpha}{3} - y[k]\right)^2$ | | Outcome A (Category 1) |

TABLE 1.C

Direct Application of "Shakiba Dissertation, supra" to $1 + \alpha z^{-1}$ 4-PAM DF-RSSD
When Starting from State Outcome C (Hyper-State 0 = State + ⅓ and Hyper-State 1 = State + 1)
($C = -2\alpha/3$)

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} + \frac{\alpha}{3} < y[k] + C$ | $\left(+\frac{1}{3} + \frac{\alpha}{3} - y[k]\right)^2$ | $\left(+1 + \frac{\alpha}{3} - y[k]\right)^2$ | $\left(+\frac{1}{3} + \alpha - y[k]\right)^2$ | $(+1 + \alpha - y[k])^2$ | Outcome C (Category 1) |
| $+\frac{1}{3} - \frac{\alpha}{3} < y[k] + C < +\frac{1}{3} + \frac{\alpha}{3}$ | | | | $\left(-\frac{1}{3} + \alpha - y[k]\right)^2$ | Outcome B or Outcome C (Category 2) |
| $-\frac{1}{3} + \frac{\alpha}{3} < y[k] + C < +\frac{1}{3} - \frac{\alpha}{3}$ | | | $\left(-\frac{1}{3} + \frac{\alpha}{3} - y[k]\right)^2$ | | Outcome B (Category 1) |

TABLE 1.C-continued

Direct Application of "Shakiba Dissertation, supra" to $1 + \alpha z^{-1}$ 4-PAM DF-RSSD
When Starting from State Outcome C (Hyper-State 0 = State + ⅓ and Hyper-State 1 = State + 1)
($C = -2\alpha/3$)

| Input Signal Bin | Branch Metric B00 | Branch Metric B01 | Branch Metric B10 | Branch Metric B11 | Estimated Outcome for Next Step |
|---|---|---|---|---|---|
| $-\frac{1}{3} - \frac{\alpha}{3} < y[k] + C < -\frac{1}{3} + \frac{\alpha}{3}$ | | | $(-1 + \alpha - y[k])^2$ | | Outcome A or Outcome B (Category 2) |
| $y[k] + C < -\frac{1}{3} - \frac{\alpha}{3}$ | $\left(-1 + \frac{\alpha}{3} - y[k]\right)^2$ | | | | Outcome A (Category 1) |

Figure 10A:
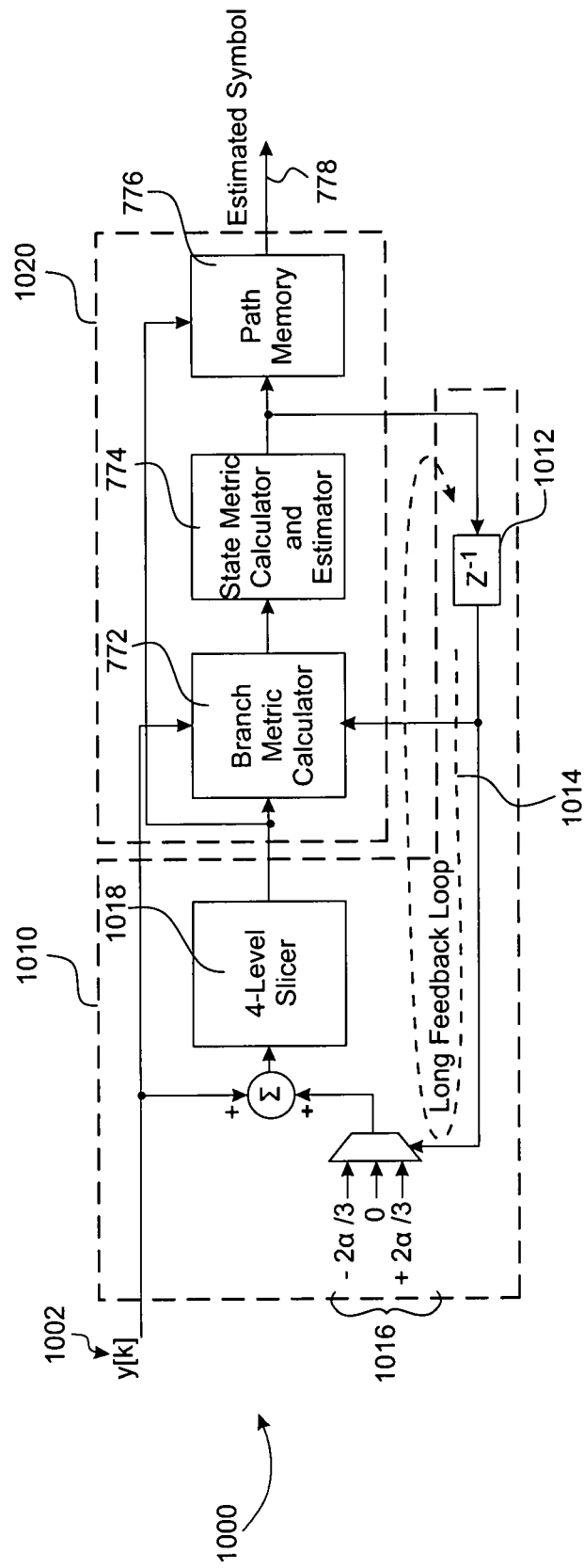
FIG. 10(A) is a block diagram of a DF-RSSD (Decision Feedback-Reduced-State Sequence Detection) system according to described examples.

As can be seen in Tables 1.A to 1.C, for every starting outcome (Outcome A, B, or C), the resulting outcome could be either a member of Category 1 (fully resolved) or Category 2 (need the output of the sequence detector to resolve between two possible Outcomes). Similar to the technique described in the Shakiba Dissertation, supra, in this example, Category 2 constitutes scenarios in which the resulting outcome cannot be estimated until the sequence detector has made its decision. FIG. 10(A) depicts the DF-RSSD diagram that results from this system approximation and simplification, as described in greater detail below.

The timing requirement problem of RSSD can also be solved by a second technique, different from the one described in the Shakiba Dissertation, supra and summarized above. DFE loop-unrolling or speculation is a commonly used method to remove or relax the timing requirement of a DFE detector. DFE loop unrolling is described in detail by K. K. Parhi in "High-Speed Architectures for Algorithm with Quantizer Loops," IEEE Symposium onCircuits and Systems, pp. 2357-2360, 1990. Briefly, this method unrolls the usual DFE feedback, considers all the possible outcomes of the decision in the feedback path, and pre-calculates (or speculates) all the values that they entail. Once the decisions are made, it selects the speculated value that corresponds to that particular decision result. Speculation enables faster DFE operation by replacing the calculation time with a much faster select time. This, however, is achieved by incurring an implementation penalty which requires parallel resources to pre-calculate all the possible outcomes. Loop unrolling may in theory be applied to RSSD, but it comes at a significant implementation complexity price, which can easily defeat the original purpose of reducing MLSD complexity. This is because unrolling the loop requires several parallel instantiations of the branch metric and state metric calculators, each of which is usually a computational-intensive block.

Present described examples are based on the first technique described above from the Shakiba Dissertation. This technique may in some examples be modified such that the scenarios that fall in the second category can be further portioned into smaller scenarios that can be converted to the first category with a negligible performance penalty. As a result, in some examples the entire RSSD becomes free of its need to have the results of the sequence detector, hence the decision feedback.

By reducing the long decision feedback path to a shorter and faster nested feedback path, one or more advantages may be achieved in some described examples. First, by replacing the longer and slower global feedback of the decision feedback part of the DF-RSSD with a shorter and faster nested feedback, the RSSD detector can operate at a faster speed. This may enable the application of sequence detection to higher rate data communication systems. Second, the simpler nested feedback loop can be more easily unrolled without the complexity increase concern explained above. Loop unrolling provides additional opportunity for adoption of sequence detection in high rate data communication systems.

Figure 10B:
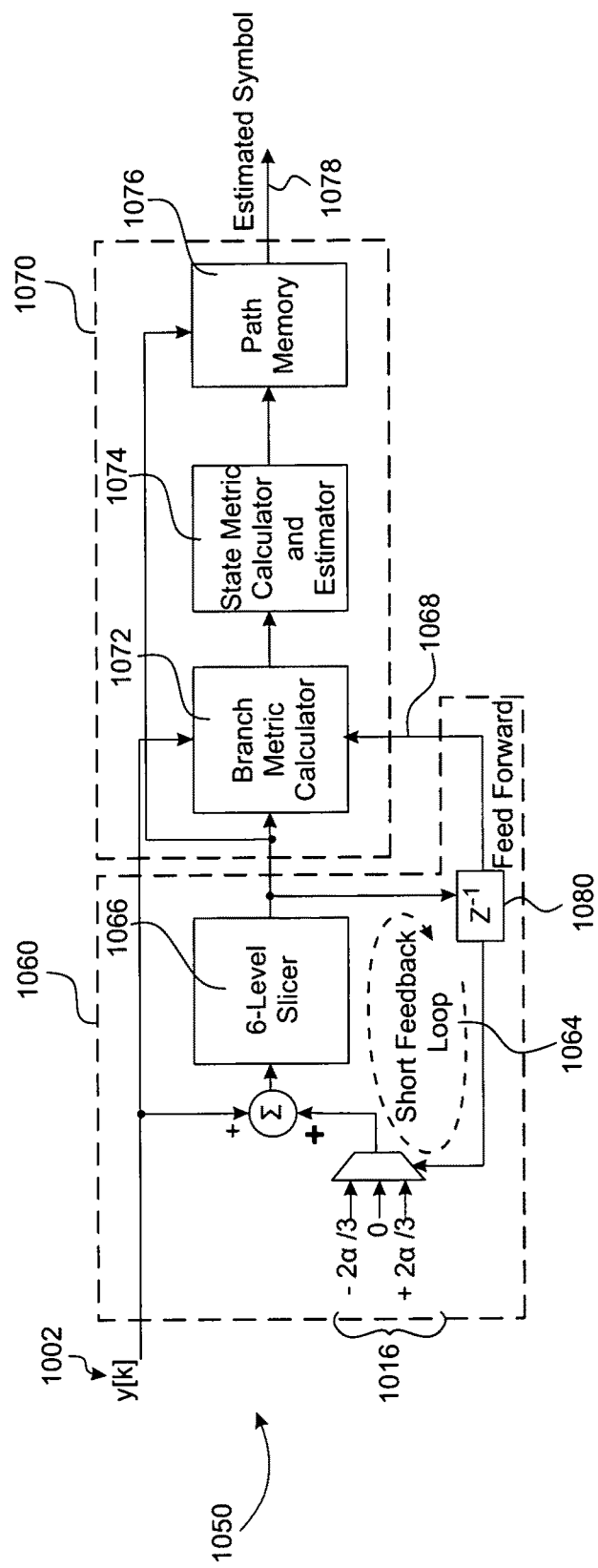
FIG. 10(B) is a block diagram of a DFF-RSSD (Decision Feed-Forward-Reduced-State Sequence Detection) system according to described examples.

Examples described herein make use of a technique in which the input bins that lead to Category 2 scenarios (i.e. scenarios that would normally require the result of the sequence detector to resolve to single Outcomes) are further binned into two sub-bins. Then, each sub-bin is approximated with a scenario that leads to a Category 1 Outcome equal to its neighboring Category 1 outcome. This is summarized and illustrated in Tables 2.A, 2.B, and 2.0 below, where Outcome cells prefixed with a tile character (~) represent the approximated decision outcomes. FIG. 10(B) depicts a DFF-RSSD diagram that implements this system approximation and simplification by the use of a 6-level slicer 1066 to bin the input signal into one of the seven bins (three unambiguous bins and two pairs of ambiguous sub-bins).

TABLE 2.A

Details of DFF-RSSD for $1 + \alpha z{-1}$ 4-PAM RSSD as per this Invention
When Starting from State Outcome A (Hyper-State 0 = State − 1 and Hyper-State 1 = State − ⅓)
($C = +2\alpha/3$)

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} + \frac{\alpha}{3} < y[k] + C$ | $\left(+\frac{1}{3} - \alpha - y[k]\right)^2$ | $(+1 - \alpha - y[k])^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |

TABLE 2.A-continued

Details of DFF-RSSD for $1 + \alpha z^{-1}$ 4-PAM RSSD as per this Invention
When Starting from State Outcome A (Hyper-State 0 = State − 1 and Hyper-State 1 = State − ⅓)
$(C = +2\alpha/3)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} < y[k] + C < +\frac{1}{3} + \frac{\alpha}{3}$ | | | | $\left(-\frac{1}{3} - \frac{\alpha}{3} - y[k]\right)^2$ | ~Outcome C (Category 1) |
| $+\frac{1}{3} - \frac{\alpha}{3} < y[k] + C < +\frac{1}{3}$ | | | | | ~Outcome B (Category 1) |
| $-\frac{1}{3} + \frac{\alpha}{3} < y[k] + C < +\frac{1}{3} - \frac{\alpha}{3}$ | | $\left(-\frac{1}{3} - \alpha - y[k]\right)^2$ | | | Outcome B (Category 1) |
| $-\frac{1}{3} < y[k] + C < -\frac{1}{3} + \frac{\alpha}{3}$ | | | | $\left(-1 - \frac{\alpha}{3} - y[k]\right)^2$ | ~Outcome B (Category 1) |
| $-\frac{1}{3} - \frac{\alpha}{3} < y[k] + C < -\frac{1}{3}$ | | | | | ~Outcome A (Category 1) |
| $y[k] + C < -\frac{1}{3} - \frac{\alpha}{3}$ | $(-1 - \alpha - y[k])^2$ | | | | Outcome A (Category 1) |

TABLE 2.B

Details of DFF-RSSD for $1 + \alpha z^{-1}$ 4-PAM RSSD as per this Invention
When Starting from State Outcome B (Hyper-State 0 = State + ⅓ and Hyper-State 1 = State − ⅓)
$(C = 0)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} + \frac{\alpha}{3} < y[k] + C$ | $\left(+\frac{1}{3} + \frac{\alpha}{3} - y[k]\right)^2$ | $\left(+1 + \frac{\alpha}{3} - y[k]\right)^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |
| $+\frac{1}{3} < y[k] + C < +\frac{1}{3} + \frac{\alpha}{3}$ | | $\left(-\frac{1}{3} + \frac{\alpha}{3} - y[k]\right)^2$ | | | ~Outcome C (Category 1) |
| $+\frac{1}{3} - \frac{\alpha}{3} < y[k] + C < +\frac{1}{3}$ | | | | | ~Outcome B (Category 1) |
| $-\frac{1}{3} + \frac{\alpha}{3} < y[k] + C < +\frac{1}{3} - \frac{\alpha}{3}$ | | | | $\left(-\frac{1}{3} - \frac{\alpha}{3} - y[k]\right)^2$ | Outcome B (Category 1) |
| $-\frac{1}{3} < y[k] + C < -\frac{1}{3} + \frac{\alpha}{3}$ | $\left(-1 + \frac{\alpha}{3} - y[k]\right)^2$ | | | | ~Outcome B (Category 1) |
| $-\frac{1}{3} - \frac{\alpha}{3} < y[k] + C < -\frac{1}{3}$ | | | | | ~Outcome A (Category 1) |
| $y[k] + C < -\frac{1}{3} - \frac{\alpha}{3}$ | | | $\left(-1 - \frac{\alpha}{3} - y[k]\right)^2$ | | Outcome A (Category 1) |

TABLE 2.C

Details of DFF-RSSD for $1 + \alpha z{-1}$ 4-PAM RSSD as per this Invention
When Starting from State Outcome A (Hyper-State 0 = State + ⅓ and Hyper-State 1 = State + 1)
$(C = -2\alpha/3)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3}+\frac{\alpha}{3}<y[k]+C$ | $\left(+\frac{1}{3}+\frac{\alpha}{3}-y[k]\right)^2$ | $\left(+1+\frac{\alpha}{3}-y[k]\right)^2$ | $\left(+\frac{1}{3}+\alpha-y[k]\right)^2$ | $(+1+\alpha-y[k])^2$ | Outcome C (Category 1) |
| $+\frac{1}{3}<y[k]+C<+\frac{1}{3}+\frac{\alpha}{3}$ | | | | $\left(-\frac{1}{3}+\alpha-y[k]\right)^2$ | ~Outcome C (Category 1) |
| $+\frac{1}{3}-\frac{\alpha}{3}<y[k]+C<+\frac{1}{3}$ | | | | | ~Outcome B (Category 1) |
| $-\frac{1}{3}+\frac{\alpha}{3}<y[k]+C<+\frac{1}{3}-\frac{\alpha}{3}$ | | $\left(-\frac{1}{3}+\frac{\alpha}{3}-y[k]\right)^2$ | | | Outcome B (Category 1) |
| $-\frac{1}{3}<y[k]+C<-\frac{1}{3}+\frac{\alpha}{3}$ | | | $(-1+\alpha-y[k])^2$ | | ~Outcome B (Category 1) |
| $-\frac{1}{3}-\frac{\alpha}{3}<y[k]+C<-\frac{1}{3}$ | | | | | ~Outcome A (Category 1) |
| $y[k]+C<-\frac{1}{3}-\frac{\alpha}{3}$ | $\left(-1+\frac{\alpha}{3}-y[k]\right)^2$ | | | | Outcome A (Category 1) |

FIG. 10(A) depicts the block diagram that results from direct applications of Tables 1.A, 1.B, and 1.0 for the DF-RSSD, and FIG. 10(B) depicts the block diagram that results from direct applications of Tables 2.A, 2.B, and 2.0 for the DFF-RSSD. FIG. 10(A) shows a hybrid DF-RSSD system 1000 similar to the one illustrated in FIG. 7(B): it consists of a decision feedback loop 1010 and a 2-state MLSD 1020. The decision feedback loop 1010 has a long feedback loop 1014, i.e. one that is dependent on the sequence detector to complete its operation. The values 1016 selected by the previous states are either [2α/3], [0], or [−2α/3], corresponding to a starting state of Outcome A, Outcome B, or Outcome C respectively. This value selection represents the application of weights 764 to the previous states in FIG. 7(B). A 4-level slicer 1018 applies the four slice levels set out in the leftmost column of Tables 1.A-C above to bin the received sample 1002 into one of the five bins corresponding to the five expected Outcomes for the next step set out in the rightmost column of Tables 1.A-C.

The $Z^{-1}$ block 1012 in this DF-RSSD system 1000 is a memory element, such as a chain of one or more delay elements with memory taps after each delay. The $Z^{-1}$ block 1012 corresponds roughly to the memory tap 762 used in the DFE-RSSD system of FIG. 7(B). However, instead of storing the previous estimated symbol value (as memory tap 762 does), the $Z^{-1}$ block in the DF-RSSD system 1000 stores the previous estimated Outcome (i.e. Outcome A, B, or C). This previous estimated Outcome determines what value is used in the calculation to bin the input signal 1002. For example, using the example calculations from Tables 1A, 1.B, and 1.C, if the previous Outcome stored at the $Z^{-1}$ block 1012 is Outcome B, then the calculations at Table 1.B are used, and the value of variable C used on the left-hand-side binning calculation is [0]. In contrast, if the previous Outcome stored at the $Z^{-1}$ block 1012 is Outcome A, then the calculations at Table 1.A are used, and the value of variable C used on the left-hand-side binning calculation is [2α/3]. Where the previous Outcome was ambiguous at the slicing stage (i.e. Category 2), the state metric calculator and estimator 774 resolves the ambiguity and provides the unambiguous estimated Outcome to the $Z^{-1}$ block 1012.

In FIG. 10(B), the long decision feedback loop 1014 of the DF-RSSD system 1000 illustrated in FIG. 10(A) is now replaced by a shorter loop 1064 in the DFF-RSSD system 1050 of FIG. 10(B). Feedback Loop 1064 is shorter than loop 1014, in both distance for the signal to travel, and time for the processing of the control input to the selection of the weighting value. The shorter loop is achieved through only using the output of slicer 1066 as the input to the $Z^{-1}$ block 1080. In addition, the output of $Z^{-1}$ is used both in the feedback loop 1064, and as a feedforward input to branch metric calculator 1072, as will be discussed below. By moving towards feedforward input in the detector 1050, the sequence detector 1070 can employ techniques that can mitigate ISI from both a previous and a subsequently transmitted symbol. Those skilled in the art will appreciate that the previously transmitted symbols can be accounted for in the sequence detector 1070 because it has already processed these symbols. There is a processing delay, also referred to as latency, caused by the functions of detector 1070. Thus, when a symbol is being processed, the samples representing the subsequently transmitted symbol are already being received. By keeping the feedback loop 1064 short, it is possible for slicer 1066 to make determinations quickly, and for the results of slicer 1066 to be provided to the branch metric calculator 1072 and path memory 1076, as well as for the results of slicer 1066 to be processed and fed forward and input 1068 to branch metric calculator 1072.

This structure may be employed both to reduce latency in various stages of the decoder and to take feed forward inputs into account to mitigate ISI caused by subsequently transmitted symbols. The illustrated 6-level slicer 1066 bins the received sample 1002 and in some embodiments may do so using the slice values set out in the leftmost column of Tables 2.A-C. This results in samples being sliced into one of the seven bins corresponding to the seven estimated Outcomes for the next step set out in the rightmost column of Tables 2.A-C. The previous output of the slicer 1066 can also be fed forward to the sequence detector 1070 as a further branch metric calculator input 1068, in accordance with Tables 2.A-C. In the illustrated example of FIG. 10(B), the branch metric calculator 1072, state metric calculator and estimator 1074, path memory 1076, and estimated symbol 1078 are all potentially different from their counterparts 772,774,776,778 in the examples of FIGS. 7(A), 7(B), and 10(A) as a result of the foregoing.

The $Z^{-1}$ block 1080 in this DFF-RSSD system 1050 is a memory element, such as a chain of one or more delay elements with memory taps after each delay. The $Z^{-1}$ block 1080 corresponds roughly to the memory tap 762 used in the DFE-RSSD system of FIG. 7(B). However, instead of storing the previous estimated symbol value (as memory tap 762 does), the $Z^{-1}$ block in the DFF-RSSD system 1050 stores the previous estimated Outcome (i.e. Outcome A, B, or C). As in the DF-RSSD system 1000 of FIG. 10(A), this previous estimated Outcome determines what value is used in the calculation to bin the input signal 1002. A key difference from the previously described DF-RSSD $Z^{-1}$ block 1012 is that the DFF-RSSD $Z^{-1}$ block 1080 is not required to wait for the disambiguation of a Category 2 outcome by the state metric calculator and estimator 1074, because an unambiguous estimated Outcome is always provided directly by the slicer 1066 at the slicing stage, in accordance with the example calculations at Tables 2.A to 2.C. Thus, the $Z^{-1}$ block 1080 can provide feedback immediately to the slicing process based on the output pf the slicer 1066, resulting in the short feedback loop 1064. The $Z^{-1}$ block 1080 also provides the previous estimated Outcome information to the branch metric calculator 1072 for use in calculating the branch metrics in conjunction with the current estimated Outcome information produced by the slicer 1066 and the input signal 1002.

Figure 11:
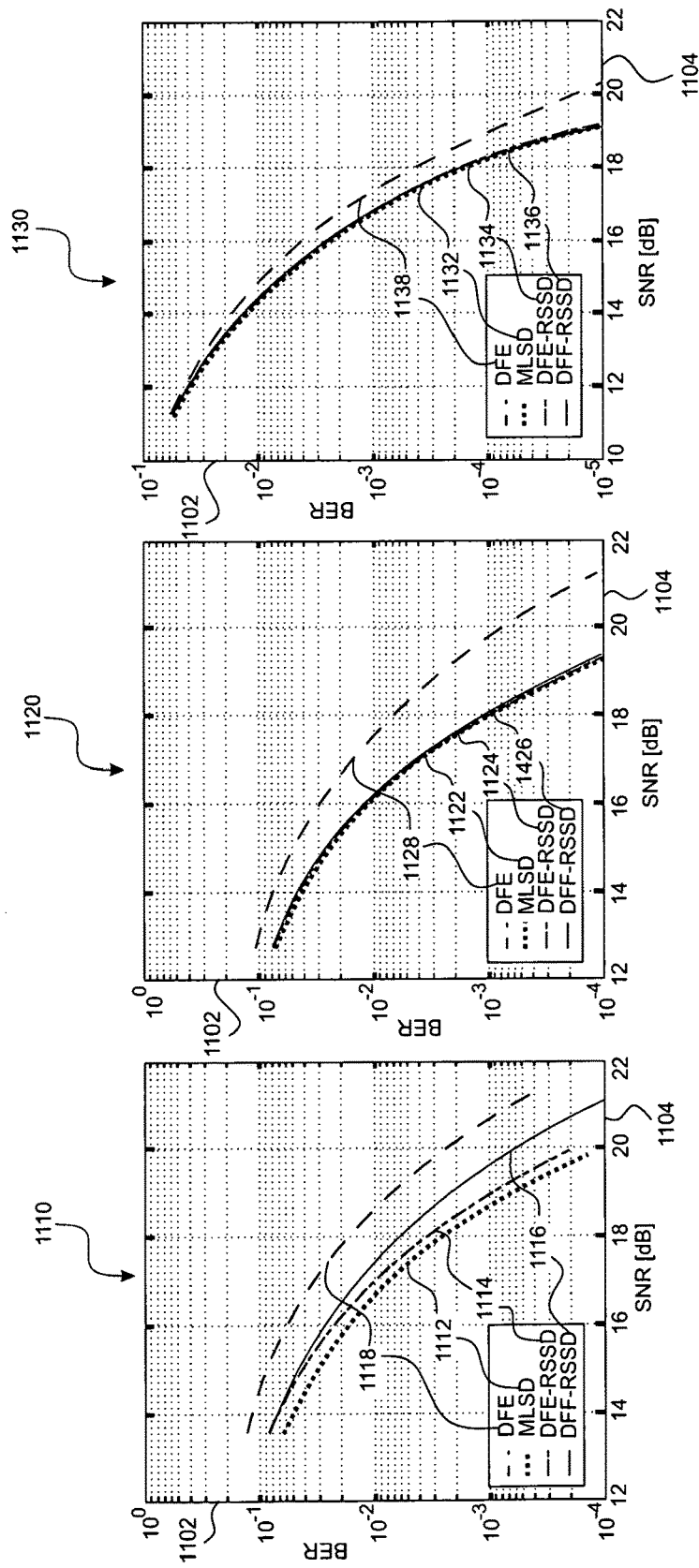
FIG. 11 is a set of three graphs plotting bit error rate performance against signal-to-noise ratio in three scenarios (transfer function coefficient $\alpha$=1, 0.8, and 0.4 on the left, middle, and right plots respectively) for four example ISI correction systems: DFE, MLSD, DF-RSSD, and DFF-RSSD according to described examples.

Recalling that $0<\alpha\leq1$, it can be inferred from Tables 1.A, 1.B, and 1.0 that as the value of a decreases (closer to 0) the input bins leading to Category 2 become narrower. As a result, the decision approximations of Tables 2.A, 2.B, and 2.C, corresponding to these bins will constitute a smaller portion of the decision making process. Similarly, a larger value of a (closer to 1) results in a bigger contribution of these bins in the overall decision. This observation suggests that the overall decisions of the example DFF-RSSD will be less accurate as a increases. FIG. 11 shows the BER performances of example DFF-RSSD, DF-RSSD, DFE, and MLSD systems, for three values of a. These example simulations involve the example $[1+\alpha z^{-1}]$ 4-PAM scheme described above.

On the left side of FIG. 11, plot 1110 shows BER (vertical axis 1102) plotted against SNR (horizontal axis 1104) for a scenario in which $\alpha=1$. The performance of DFF-RSSD 1116 in this scenario is about halfway between that of DFE 1118 and DF-RSSD 1114, while MLSD 1112 has the lowest BER, consistent with the expectations set out above. In the middle of FIG. 11, plot 1120 shows BER (vertical axis) plotted against SNR (horizontal axis) for a scenario in which $\alpha=0.8$. The performance of DFF-RSSD 1126 in this scenario is much better than that of DFE 1128, and it overlaps with and is very close to the performance of DF-RSSD 1124 and MLSD 1122. Finally, on the left side of FIG. 11, plot 1130 shows BER (vertical axis) plotted against SNR (horizontal axis) for a scenario in which $\alpha=0.4$. The performance of DFF-RSSD 1136 in this scenario is again much better than that of DFE 1138, completely overlapping with that of DF-RSSD 1134 and MLSD 1132.

Figure 12:
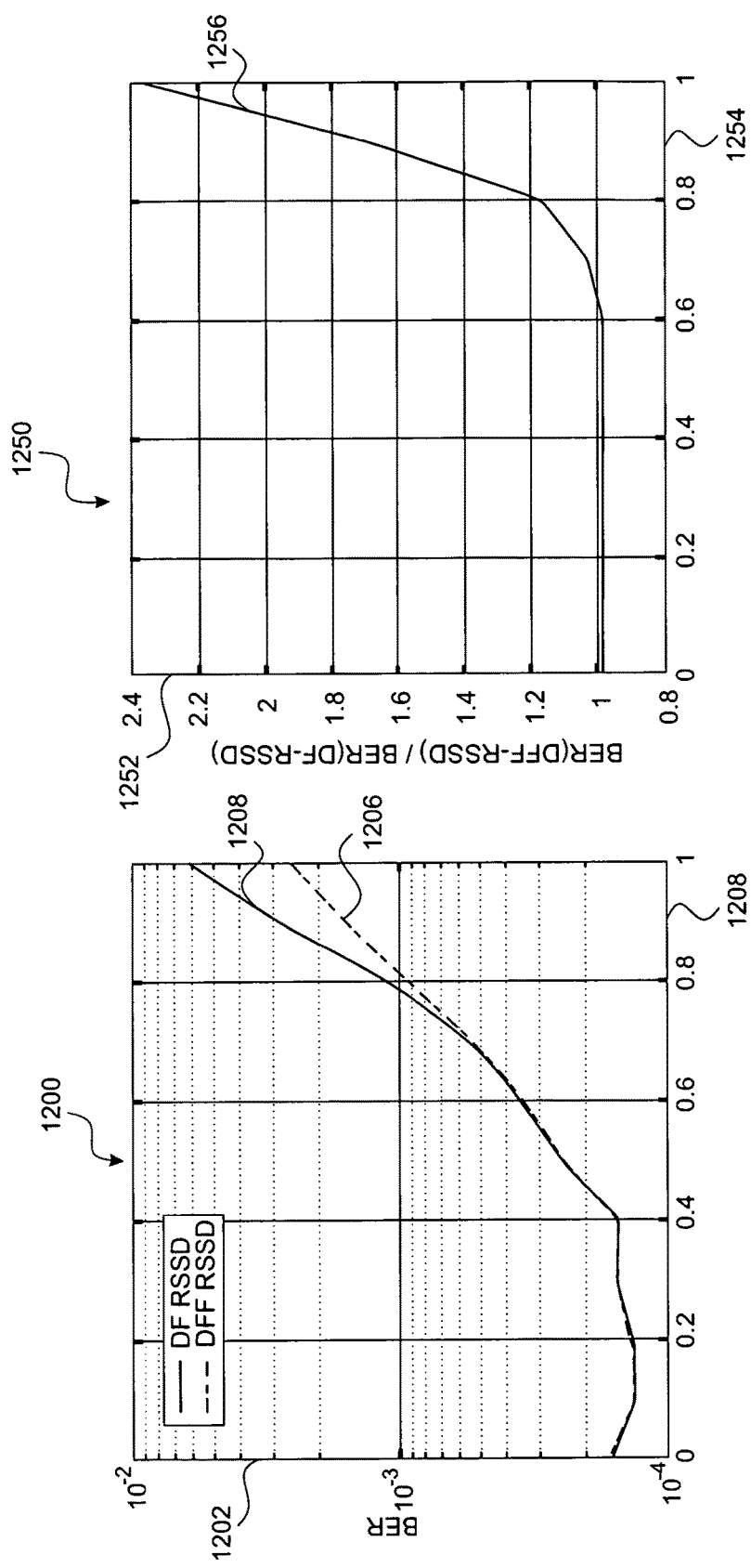
FIG. 12 is a set of two graphs plotting bit error rate performance against transfer function coefficient $\alpha$ for DF-RSSD compared to DFF-RSSD according to described examples, with absolute BER plotted on the left and relative BER plotted on the right.

In addition, FIG. 12 illustrates simulations of the absolute and relative BER performances of example DF-RSSD and DFF-RSSD detectors at SNR=18 dB as $\alpha$ is varied from 0 to 1. On the left, plot 1200 is a plot of absolute BER (vertical axis 1202) against $\alpha$ (horizontal axis 1204) for an example DF-RSSD system 1206 and an example DFF-RSSD system 1208. On the right, plot 1250 is a plot of relative BER, i.e. BER of the DFF-RSSD system 1208 divided by the BER of the DF-RSSD system 1206 (vertical axis 1252) against $\alpha$ (horizontal axis 1254). The plotted value of relative BER 1256 of the two RSSD system types is shown.

FIG. 11 and FIG. 12 verify the expected error performance of the example DFF-RSSD detector described above. Except for the very narrow high end of the range of $\alpha$, the example DFF-RSSD detector performs almost indistinguishable from the example full-state MLSD detector. Over a very wide range of $\alpha$ (and except for the very high end of its range), the example DFF-RSSD detector performs very well and with negligible penalty compared to the example DF-RSSD detector.

Even for the extreme cases as a approaches 1, the example DFF-RSSD detector still outperforms the DFE, performing at a level in between the example DF-RSSD detector and DFE. Given the potential advantages of DFF-RSSD, it is potentially well suited to address the implementation complexity of the sequence detection technique, which could otherwise be prohibitive.

A further example embodiment is a DFF-RSSD system that eliminates Category 2 outcomes altogether. Further examination of Tables 1.A, 1.B, and 1.0 reveals that yet another approach to simplifying the implementation of the reduced-state detector is possible by removing the input bins that lead to the problematic Category 2 outcomes altogether, instead of splitting them into approximated sub-bins (as in Tables 2.A-C). When removing these bins, the upper and lower slice levels of the bins are merged or combined into a slice level placed at their midpoint value. These changes to the above Tables suggest that the input binning reduces to three such combined bins, corresponding to only two slice levels, while still achieving the same goal of the above-described embodiment of DFF-RSSD due to the fact that the Category 2 outcome continue to be avoided. This simplification is particularly relevant for smaller values of a since based on the above tables, the removed bins become narrower themselves as a reduces. When put in contrast with the above-described embodiment, this second embodiment may offer the same advantages plus the new advantage of reducing the number of slicers (from four to two bins), as opposed to increasing them (from four to six). This second example embodiment of the DFF-RSSD is referred to as "SDFF-RSSD" (Simplified DFF-RSSD) from here on. Tables 3.A, 3.B, and 3.0 below illustrate the detection rules for SDFF-RSSD.

TABLE 3.A

Details of SDFF-RSSD for $1 + \alpha z-1$ 4-PAM RSSD as per this Invention
When Starting from State Outcome A (Hyper-State 0 = State − 1 and Hyper-State 1 = State − ⅓)
$(C = +2\alpha/3)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} < y[k] + C$ | $\left(+\frac{1}{3} - \alpha - y[k]\right)^2$ | $(+1 - \alpha - y[k])^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |
| $-\frac{1}{3} < y[k] + C < +\frac{1}{3}$ | | $\left(-\frac{1}{3} - \alpha - y[k]\right)^2$ | | $\left(-\frac{1}{3} - \frac{\alpha}{3} - y[k]\right)^2$ | Outcome B (Category 1) |
| $y[k] + C < -\frac{1}{3}$ | $(-1 - \alpha - y[k])^2$ | | | $\left(-1 - \frac{\alpha}{3} - y[k]\right)^2$ | Outcome A (Category 1) |

TABLE 3.B

Details of SDFF-RSSD for $1 + \alpha z-1$ 4-PAM RSSD as per this Invention
When Starting from State Outcome B (Hyper-State 0 = State + ⅓ and Hyper-State 1 = State − ⅓)
$(C = 0)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} < y[k] + C$ | $\left(+\frac{1}{3} + \frac{\alpha}{3} - y[k]\right)^2$ | $\left(+1 + \frac{\alpha}{3} - y[k]\right)^2$ | $\left(+\frac{1}{3} - \frac{\alpha}{3} - y[k]\right)^2$ | $\left(+1 - \frac{\alpha}{3} - y[k]\right)^2$ | Outcome C (Category 1) |
| $-\frac{1}{3} < y[k] + C < +\frac{1}{3}$ | | $\left(-\frac{1}{3} + \frac{\alpha}{3} - y[k]\right)^2$ | | $\left(-\frac{1}{3} - \frac{\alpha}{3} - y[k]\right)^2$ | Outcome B (Category 1) |
| $y[k] + C < -\frac{1}{3}$ | $\left(-1 + \frac{\alpha}{3} - y[k]\right)^2$ | | | $\left(-1 - \frac{\alpha}{3} - y[k]\right)^2$ | Outcome A (Category 1) |

TABLE 3.C

Details of SDFF-RSSD for $1 + \alpha z-1$ 4-PAM RSSD as per this Invention
When Starting from State Outcome A (Hyper-State 0 = State + ⅓ and Hyper-State 1 = State + 1)
$(C = -2\alpha/3)$

| Input Signal Bin | Branch Metric B00 | Branch Metric B01 | Branch Metric B10 | Branch Metric B11 | Estimated Outcome for Next Step |
|---|---|---|---|---|---|
| $+\frac{1}{3} < y[k] + C$ | $\left(+\frac{1}{3} + \frac{\alpha}{3} - y[k]\right)^2$ | $\left(+1 + \frac{\alpha}{3} - y[k]\right)^2$ | $\left(+\frac{1}{3} + \alpha - y[k]\right)^2$ | $(+1 + \alpha - y[k])^2$ | Outcome C (Category 1) |
| $-\frac{1}{3} < y[k] + C < +\frac{1}{3}$ | | $\left(-\frac{1}{3} + \frac{\alpha}{3} - y[k]\right)^2$ | | $\left(-\frac{1}{3} + \alpha - y[k]\right)^2$ | Outcome B (Category 1) |
| $y[k] + C < -\frac{1}{3}$ | $\left(-1 + \frac{\alpha}{3} - y[k]\right)^2$ | | $(-1 + \alpha - y[k])^2$ | | Outcome A (Category 1) |

Comparisons of Tables 3.A, 3.B, and 3.0 to their counterpart Tables 2.A, 2.B, and 2.0 reveals a further significant reduction in implementation complexity by moving from DFF-RSSD to SDFF-RSSD. This reduction mainly comes from reducing the number of slice levels from six to two, but also partly from more harmonization in detection rules for the three outcomes A, B, and C.

Figure 13:
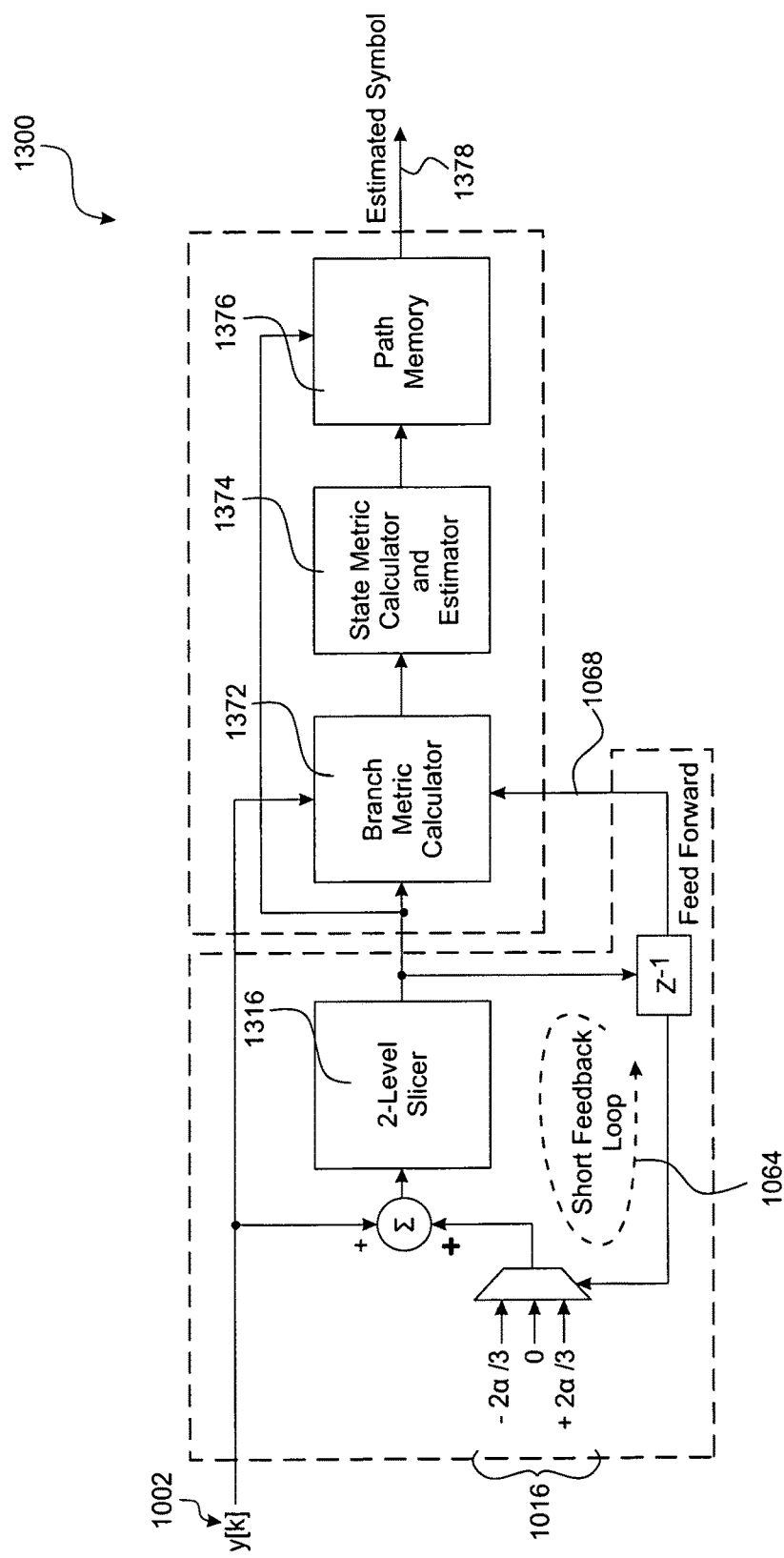
FIG. 13 is a block diagram of an SDFF-RSSD (Simplified Decision Feed-Forward-Reduced-State Sequence Detection) system according to described examples.

FIG. 13 illustrates a block diagram of an example SDFF-RSSD system 1300, based on the example binning/slicing implementation shown in Tables 3.A, 3.B, and 3.C. The SDFF-RSSD system 1300 is essentially identical to the DFF-RSSD system 1050 of FIG. 10(B), with the 6-level slicer 1066 corresponding to the slice levels of Tables 2.A-C replaced by a 2-level slicer 1316 corresponding to the slice levels of Tables 3.A-C. This change in the slice levels implemented by the 2-level slicer 1316 is accompanied by complementary changes in the implementation of the branch metric calculator 1373, the state metric calculator and estimator 1374, and the path memory 1376, and may result in different estimated symbols 1378 at the output.

Figure 14:
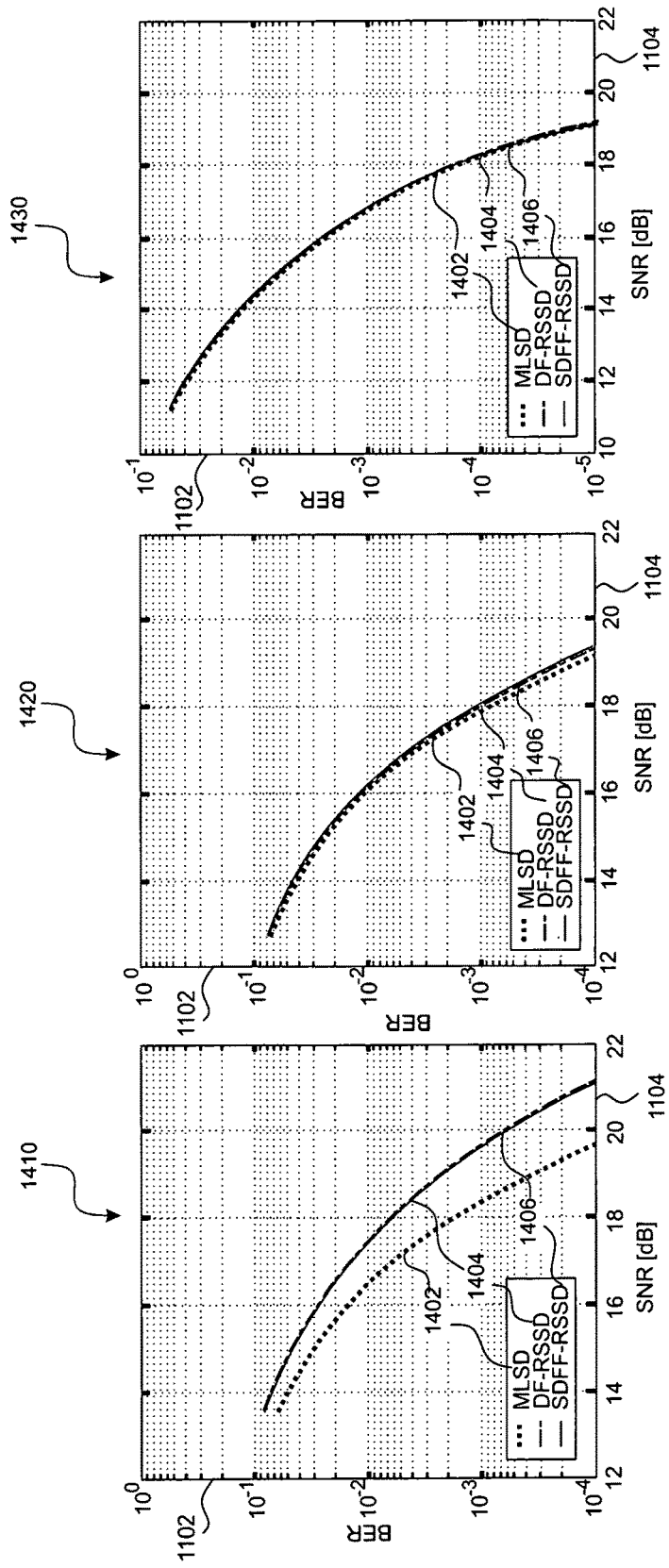
FIG. 14 is a set of three graphs plotting bit error rate performance against signal-to-noise ratio in three scenarios (transfer function coefficient $\alpha$=1, 0.8, and 0.4 on the left, middle, and right plots respectively) for three example ISI correction systems: MLSD, DFF-RSSD, and SDFF-RSSD according to described examples.

FIG. 14 shows BER simulation results of an example SDFF-RSSD detector. As in FIG. 11, three values of $\alpha$ are shown: plot 1410 uses the value $\alpha=1$, plot 1420 uses the value $\alpha=0.8$, and plot 1430 uses the value $\alpha=0.4$. The results for MLSD 1402 and DFF-RSSD 1404 are repeated for comparisons. As expected, the performance of SDFF-RSSD 1406 and DFF-RSSD 1404 are identical as a approaches 0, and they perform extremely close over the entire range of $0 < \alpha \leq 1$.

The examples described can be generalized. Generally, an M-PAM signaling scheme modulates log 2M bits into one of the equally-spaced M levels. If one assumes arbitrarily that PAM levels are spaced between levels −1 and +1, this results in the following M levels for the input symbol x, at each time step:

$$x = \frac{M - (2m - 1)}{M - 1}, m = 1, 2, \ldots, M \quad \text{Equation (1)}$$

which for the case of 4-PAM (M=4) results in four levels of +1, +⅓, −⅓, and −1, as expected.

Note that one can consider any other set of equally-spaced levels (rather than between −1 and +1) and simply and proportionally scale all the corresponding signal values in the analysis.

A more general transfer function polynomial can be expressed by the following formula, which simply expresses how the inter-symbol interference from the last N previous symbols contaminate the current symbol:

$$H(z^{-1}) = \underbrace{1}_{\text{Represents current Symbol}} + \underbrace{\sum_{n=1}^{N} \alpha_n \cdot (z^{-1})^n}_{\text{Represents ISI from Last N Previous Symbols}} \quad \text{Equation (2)}$$

For example, setting N=1 and $\alpha_1 = \alpha$ yields the generalized Duobinary transfer function polynomial $1 + \alpha z^{-1}$ considered before.

Figure 15:
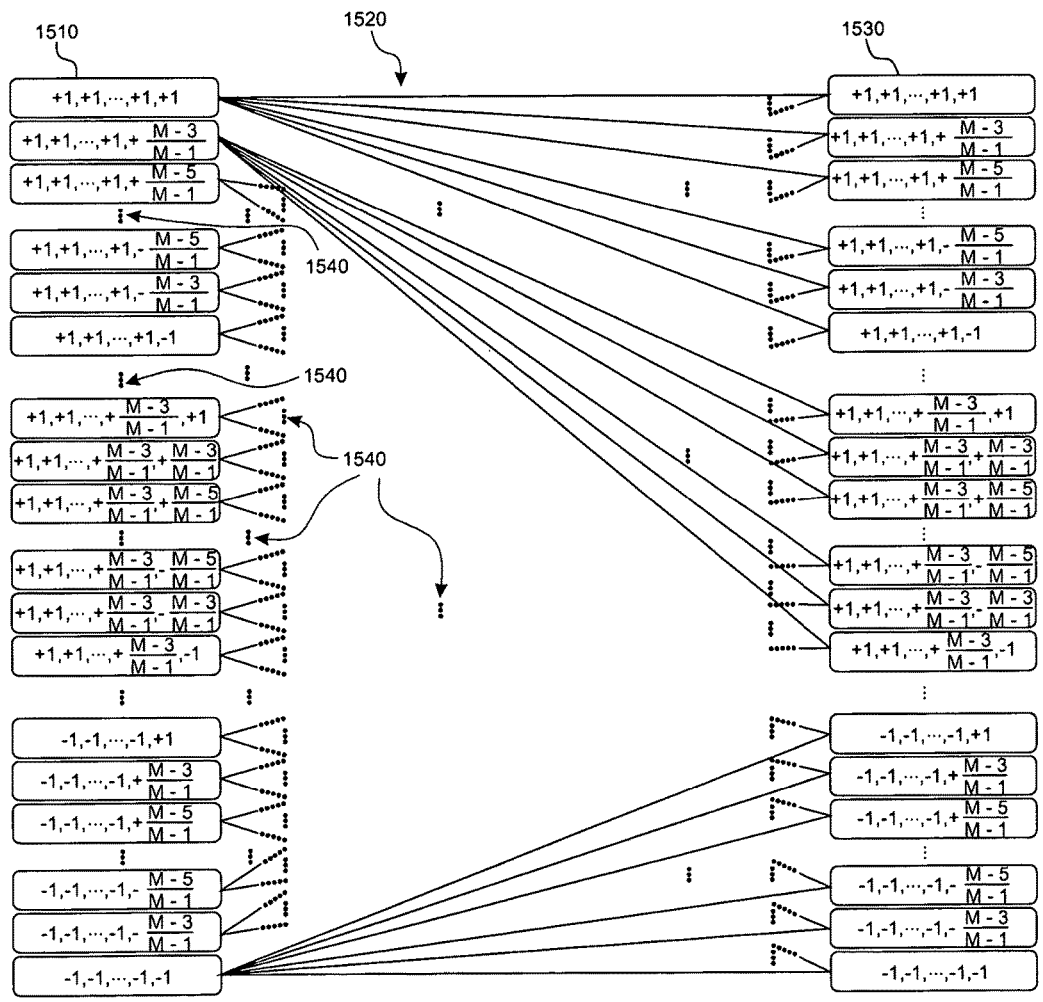
FIG. 15 is a trellis diagram resulting from the application of an Nth-order transfer function polynomial to an M-PAM signal according to described examples.

Application of the general transfer function polynomial to the M-PAM signal results in a trellis diagram with $M^N$ states, where each state represents a memory of N previous symbols, with each symbol having one of the M possible levels. There will be M branches branching out of each state, corresponding to M possible values of the input signal at each time step. The branches transition their originating state into one of the M possible states that would result by serially shifting the memory of the N previous symbols and adding the input as the new member of the memory. In other words, this serial shift results in the chain replacement of N-1→N, N-2→N-1, ... 1→2, in →1, which moves the $N^{th}$ member outside the memory. Note that the serial shift is a direct consequence of the memory chain behavior of the transfer function polynomial which represents the ISI part of the signal. FIG. 15 depicts the trellis diagram of this general case. The memory chain states at the current time step 1510 are shown on the left, while the memory chain states at the next time step 1530 are shown on the right, with transitions 1520 between them. The ellipses 1540 denote the generalization of this scheme to arbitrary values of M and N.

For the case of 4-PAM (M=4) and the generalized Duobinary transfer function polynomial of $1+\alpha z^{-1}$ (N=1), there will be four states ($M^N$=4), each representing one previous symbol with one of the four levels of +1, +⅓, −⅓, and −1. Four branches, corresponding to four symbol levels at each time step, branch out to four states at the next time step. These transitions replace the state memories which contained the previous symbol values, with the new values of the current symbol. This is thus a specific case of the generalized scheme illustrated in FIG. 15, and it matches the trellis diagram for the 4-PAM generalized Duobinary scheme shown in FIG. 9 and described previously.

The state vector $S_i$ (the value of i ranging from 1 to $M^N$) at time step k is denoted as $S_i[k]$. For every such state vector $S_i$, there will be M branches out to M of the $M^N$ states at time step k+1, $S_i[k+1]$, based on the level of the input symbol at time step k. The input symbol at time step k, denoted by x[k], is given by Equation (1). The M branches out follow the generalized scheme of FIG. 15. It is thus straightforward to see that the $i^{th}$ state $S_i[k]$ can be represented by the last N previous symbols, namely:

$$S_i[k] = x[k-N], x[k-N+1], \ldots, x[k-2], x[k-1] \quad \text{Equation (3)}$$

Applying the polynomial of Equation (2) above to Equation (3) above, and using Equation (1) above to express the input signal levels, yields the following expected output $y_{expected\ i,j}[k]$, associated with transitioning from state $S_i[k]$ to $S_j[k+1]$:

$$y_{expected\ i,j}[k] = x[k] + \sum_{n=1}^{N} \alpha_n \cdot x[k-n] = \quad \text{Equation (4)}$$

$$\frac{M - (2m[k] - 1)}{M - 1} + \sum_{n=1}^{N} \alpha_n \cdot \frac{M - (2m[k-n] - 1)}{M - 1}$$

where m[k−n] (n=0, 1, 2, ..., N) represents the index of the input symbol level at time step k−n.

Recalling that each branch metric is a metric representing the distance between the received signal and the expected signal associated with that branch, $b_{i,j}[k]$, the branch metric of the branch that represents transition from state $S_i[k]$ to $S_j[k+1]$ can be calculated using the following formula:

$$b_{i,j}[k] = (y_{expected\ i,j}[k] - y[k])^2 = \quad \text{Equation (5)}$$

$$\left( \frac{M - (2m[k] - 1)}{M - 1} + \sum_{n=1}^{N} \alpha_n \cdot \frac{M - (2m[k-n] - 1)}{M - 1} - y[k] \right)^2$$

where Equation (4) above is used for $y_{expected\ i,j}[k]$, and y[k] is the received signal which also includes noise.

In calculating branch metrics, mean-square error is used in the present example. Other criteria may be applied in other examples depending on the application or other factors.

One can easily confirm that application of Equations (3) and (4) above to the 4-PAM generalized Duobinary example described above yields the input/output pairs as labeled on the trellis diagram of FIG. 9.

To reduce the number of states to implement an RSSD version of the MLSD, state partitioning guidelines can be followed to minimize the penalty. General principles and implementations relevant to state partitioning are addressed in detail by Eyuboglu and Qureshi, supra. The currently described examples are not limited to any particular state partitioning scheme and are not limited to schemes wherein the partitioning is optimum. on the examples described below instead address how ambiguities are resolved during the detection process once the states are partitioned and grouped into hyper-states. As discussed above, this resolution involves deciding between branches that become parallel to each other as a result of state grouping. These branches are either initiated from the same state or different states as was demonstrated by the generalized Duobinary example of FIG. 9.

The resolution mechanism for resolving parallel branches between two hyper-states depends on whether the branches had initiated from the same or different states. If the parallel branches had initiated from different states, the decision feedback will directly provide the resolution, since it contains specific information about the resolved state members of the hyper-states from the previous time step. This was demonstrated in the DF-RSSD of the generalized Duobinary example of FIG. 10(A), and through that portion of the feedback that feeds the previous states (output of the $z^{-1}$ block 1012) directly to the branch metric calculator 772.

However, if the branches that have been put in parallel had initiated from the same state, then the resolution also requires involvement of slicers. This was also demonstrated in the DF-RSSD of the generalized Duobinary example of FIG. 10(A), and through the other portion of the feedback that feeds the previous states (output of the z−1 block 1012) to the input slicer 1018 and then to the branch metric calculator 772. Note that the decisions are still contributing to branch resolutions, but indirectly and through adding a selectable value to the slice levels.

While the former resolution mechanism is more straightforward, the latter deserves more explanation. The parallel branches that initiate from the same state correspond to the expected output signals given by Equation (4) above. This expression has two parts to it: a first part that is contributed by the current symbol and a second part that is the ISI contributed by a summation of the previous symbols. Since for the branches of interest the initiating state is the same, the ISI terms for all these branches are also the same. In other words, the expected output values for all these branches are only different due to the difference in their corresponding current symbols. Equation (6) below gives the expected output signal values for p branches initiating from state i and ending at states $j_1$ to $j_p$, and corresponding top current symbols $x_1$ to $x_p$.

$$y_{expected\ i,j_1}[k] = x_1[k] + \sum_{n=1}^{N} \alpha_n \cdot x[k-n] \qquad \text{Equation (6)}$$

$$\vdots$$

$$y_{expected\ i,j_m}[k] = x_p[k] + \sum_{n=1}^{N} \alpha_n \cdot x[k-n]$$

Since the received signal is also contaminated by noise, the resolution solution to this set of parallel branches is to optimally place a set of slicing levels in between the expected signal levels that are to be resolved and select the branch that has its corresponding expected output closest to the received signal. The exact placement of the slicing levels depends on the noise characteristic and is preferably at the midpoints of the expected levels for a random Gaussian noise. As an example, for the p expected values given by Equation (6) above, the slicing levels are the p−1 values shown by Equation (7) below:

$$\text{Slicing Levels} = \begin{cases} \frac{1}{2}(y_{expected\ i,j_1}[k] + y_{expected\ i,j_2}[k]) = \\ \frac{1}{2}(x_1[k] + x_2[k]) + \sum_{n=1}^{N} \alpha_n \cdot x[k-n] \\ \vdots \\ \frac{1}{2}(y_{expected\ i,j_{p-1}}[k] + y_{expected\ i,j_p}[k]) = \\ \frac{1}{2}(x_{p-1}[k] + x_p[k]) + \sum_{n=1}^{N} \alpha_n \cdot x[k-n] \end{cases} \qquad \text{Equation (7)}$$

Note that the slicing levels of Equation (7) above have two terms each: a first term that is a function of the current symbol, and a second term that is a function of the previous decisions and the polynomial coefficients. This is consistent with the explanation given previously about indirect contribution of the previous decisions in ambiguity resolution associated with this type of parallel branches.

Turning one's attention again to the 4-PAM generalized Duobinary example considered previously and as illustrated in FIG. 9, the 2-state RSSD trellis diagram 904 was generated by combining states +1 and −⅓ into hyper-state 1 702 and states −1 and +⅓ into hyper-state 0 704, thereby defining four parallel branches between any of the two hyper-states at the current time step and the next time step (e.g. four branches 906).

For each set of four parallel branches, two of them were originated from different states. The resolution between these two sub-sets was provided by the decision feedback loop directly, and illustrated in FIG. 10(A). For resolution of the two branches within each sub-set, however, signal slicing is also required. It can be seen that Equation (6) above yields the expected output values associated with these branches, and consequently Equation (7) above yields all the slicing levels given in the first columns of Tables 1.A, B, and C.

Figure 16:
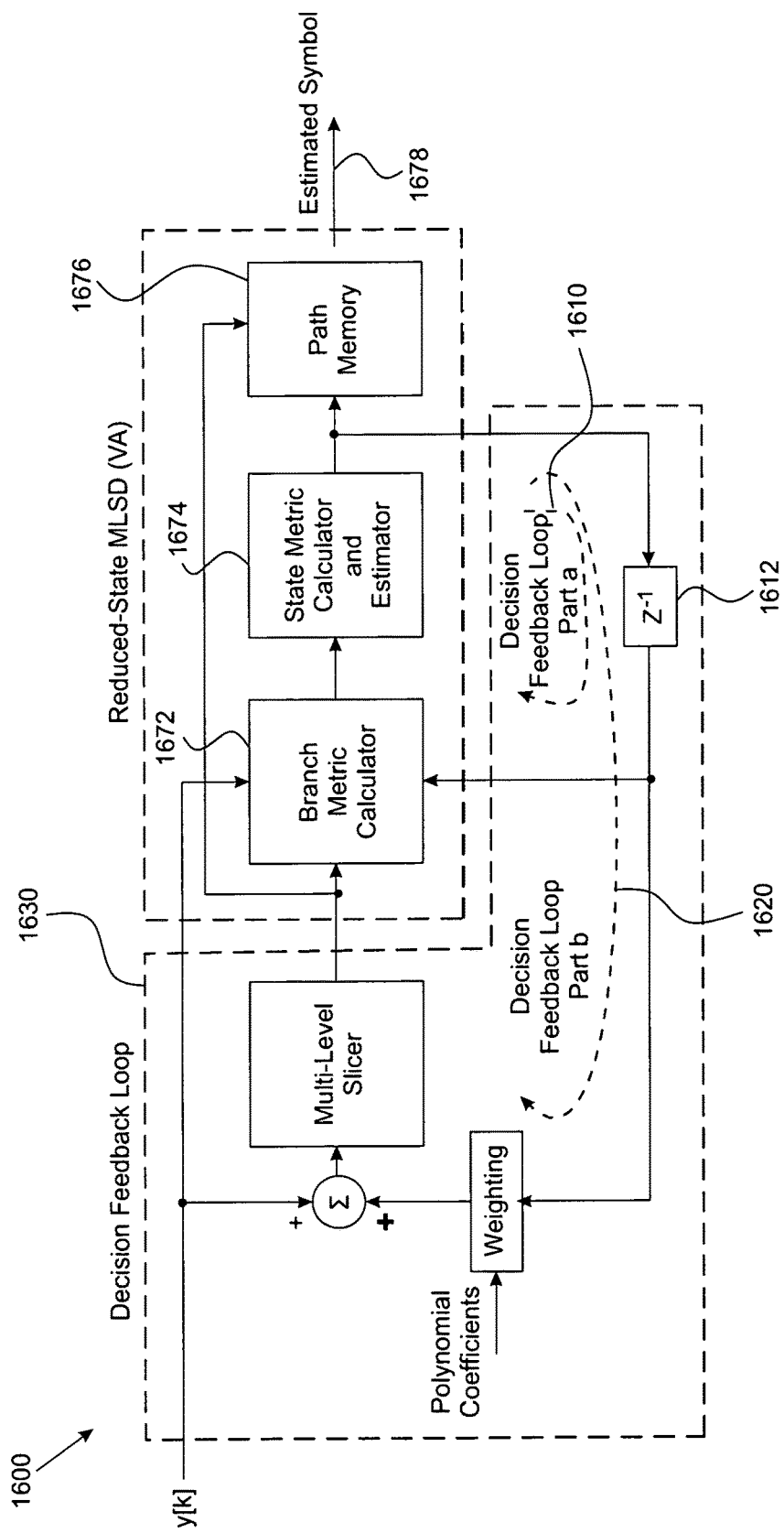
FIG. 16 is a block diagram of a DF-RSSD (Decision Feedback-Reduced-State Sequence Detection) system according to described examples.

The two ambiguity resolution mechanisms for parallel branches of the reduced-state sequence detector can be represented by the generalized DF-RSSD detector 1660 diagram of FIG. 16 for detecting signals resulting from application of the general transfer function polynomial of Equation (2) above to the M-PAM signal of Equation (1) above. In this figure, the two parts of the decision feedback responsible for each type of branch resolution are highlighted: there is a first loop 1610 responsible for resolving parallel branches initiated from different states, and a second loop 1620 responsible for resolving parallel branches initiated from the same state. Note that the combined decision feedback loop 1630 is still a long loop, similar to the illustrative example of the 4-PAM generalized Duobinary described previously. The $Z^{-1}$ block 1612 in this architecture is a generalized (e.g., multi-tap polynomial) version of the $Z^{-1}$ block 1012 from FIG. 10(A).

The operation of the DF-RSSD architecture of FIG. 16 can be encapsulated in a tabular format and similar to the set of Tables 1.A-C through the following steps, which are essentially the same steps demonstrated by the 4-PAM generalized Duobinary example before:
 1. Use the M-PAM signal levels and the Nth-order transfer function polynomial to generate the full-state trellis diagram.
 2. Decide on state partitioning and convert the full-state trellis diagram to the reduced-state trellis diagram and specify the resulting parallel branches that connect hyper-states.

3. Identify the state outcomes of the detector, which are essentially all the possible combinations of the member states of the hyper-states.
4. For each starting state outcome, construct a set of case tables similar to Tables 1.A-C to tabulate the input signal bins, branch metric assignments, and resulting state outcomes for each starting outcome. The combination of these tables (one table for each starting state outcome) represent direct resolutions by the decision feedback loop, illustrated by the first loop 1610 of FIG. 16.
5. Use slicing level calculation expressions given by Equation (7) above to calculate slicing levels that bin the input signal for each set of parallel branches that initiate from the same state. This step represents the indirect resolution by the decision feedback loop, illustrated the second loop 1620 in FIG. 16 and corresponds to the first column of the case tables (e.g. Tables 1.A-C).
6. Once the branches are resolved, calculate branch metrics associated with each signal bin based on the choice of error criteria (e.g. mean-square error). This step populates the branch metric entries of the tables.
7. For each bin of the tables, derive the scenario outcomes of the reduced-state sequence detector in the next time step and categorize them into one of the two scenarios where either the next step decisions can be made without the need for the completion of the sequence detection (Category 1) or the decisions still rely on the availability of the results of the sequence detector (Category 2). This step corresponds to the last column of the tables.

Figure 17:
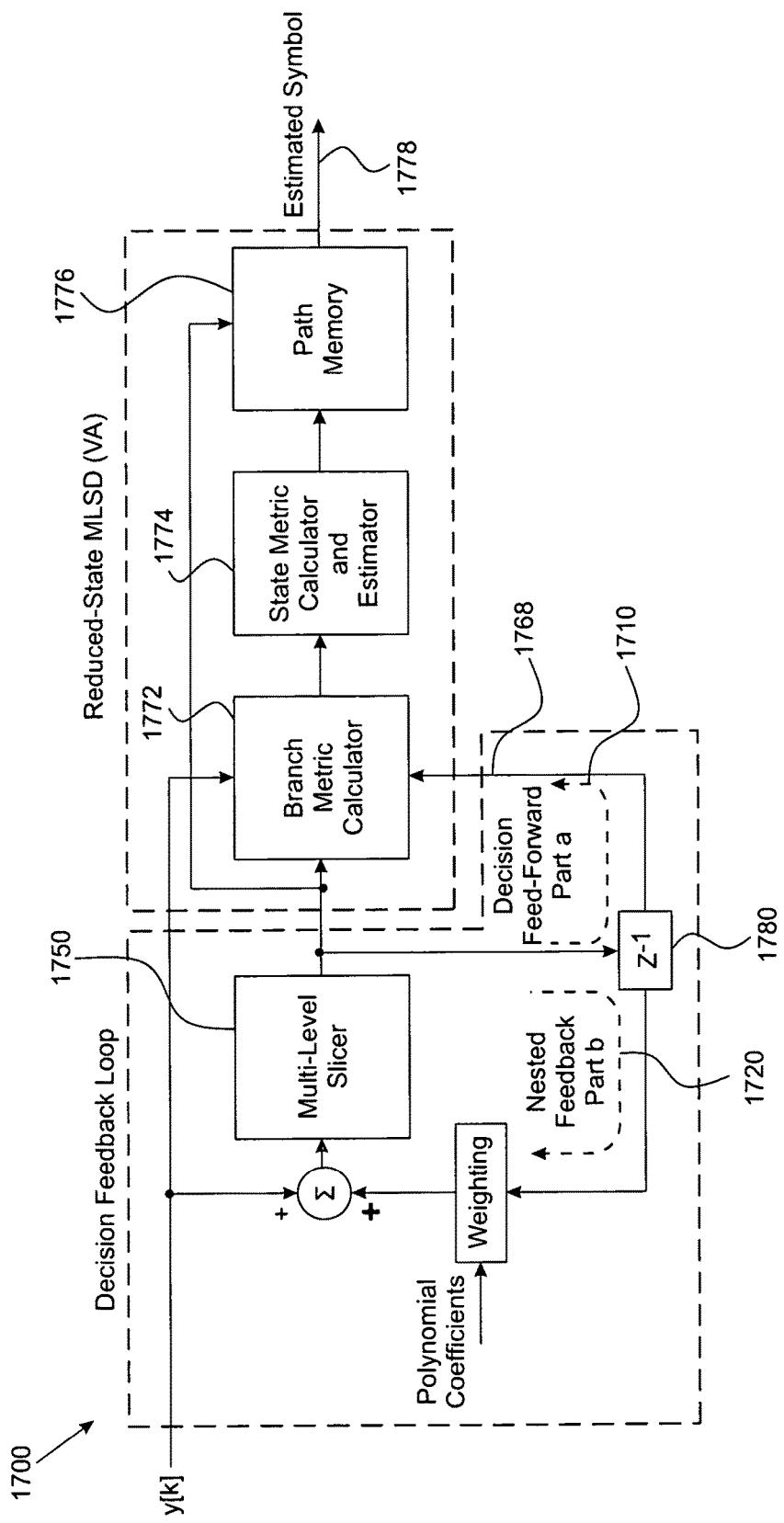
FIG. 17 is a block diagram of a DFF-RSSD (Decision Feed-Forward-Reduced-State Sequence Detection) system according to described examples.

A generalized (e.g. multi-tap) DFF-RSSD architecture is illustrated in FIG. 17. The differences between the DF-RSSD architecture of FIG. 16 and the DFF-RSSD architecture of FIG. 17 are roughly analogous to the differences between the single-tap DF-RSSD architecture of FIG. 10(A) and the single-tap DFF-RSSD architecture of FIG. 10(B). In FIG. 17, the long decision feedback loop 1620 of the DF-RSSD system 1600 illustrated in FIG. 16 is now replaced by a shorter feedback loop 1720 in the DFF-RSSD system 1700 of FIG. 17. Feedback Loop 1720 is shorter than loop 1620, in both distance for the signal to travel, and time for the processing of the control input to the selection of the weighting value. The shorter loop 1720 is achieved through only using the output of slicer 1750 as the input to the $Z^{-1}$ block 1780. In addition, the output of $Z^{-1}$ 1780 is used both in the feedback loop 1720, and as a feedforward input 1768 to branch metric calculator 1772. By keeping the feedback loop 1720 short, it is possible for slicer 1750 to make determinations quickly, and for the results of slicer 1750 to be provided to the branch metric calculator 1772 and path memory 1776, as well as for the results of slicer 1750 to be processed and fed forward as input 1768 to branch metric calculator 1772. In the illustrated example of FIG. 17, the branch metric calculator 1772, state metric calculator and estimator 1774, path memory 1776, and estimated symbol 1778 are all potentially different from their counterparts 1672,1674,1676,1678 in the examples of FIG. 16 as a result of the foregoing. The $Z^{-1}$ block 1780 in this architecture is a generalized (e.g., multi-tap polynomial) version of the $Z^{-1}$ block 1080 from FIG. 10(B).

Mathematically, the conversion of the DF-RSSD architecture of FIG. 16 to the DFF-RSSD architecture of FIG. 17 can be carried out through the transformation described below. This is the transformation that converted the set of Tables 1.A-C to the set of Tables 2.A-C for the 4-PAM generalized Duobinary example. The transformation steps are:

1. Identify Category 2 outcomes of the DF-RSSD set of tables and their closest neighboring Category 1 outcomes.
2. Place additional slicing levels in the middle of each bin that corresponds to Category 2 outcomes to divide each bin into two smaller sub-bins.
3. For each new sub-bin, identify its closest neighboring Category 1 outcome and replace its Category 2 outcome with this Category 1 outcome. This step essentially shortens the long decision feedback loop (second loop 1620) in the DF-RSSD detector of FIG. 16 into a nested loop and converts the decision feedback loop (first loop 1610) to a decision feed-forward.

Thus, the generalized DFF-RSSD system 1700 of FIG. 17 illustrates a DFF-RSSD architecture diagram for detecting signals generated from application of the general transfer function polynomial of Equation (2) above to the M-PAM signal of Equation (1) above. Compared to the DF-RSSD system 1600 of FIG. 16, the decision feed-forward loop 1710 resolves parallel branches initiated from different states, and the feedback loop 1720 resolves parallel branches initiated from the same state, while the number of slicing levels at the slicer 1750 is increased. As a result of these changes, similar timing improvement and complexity reduction, illustrated by the 4-PAM generalized Duobinary example, are also achieved in this general case.

An alternative mathematical conversion of the DF-RSSD architecture of FIG. 16, to a further simplified SDFF-RSSD architecture (analogous to the single-tap SDFF-RSSD architecture of FIG. 13) through the transformation described below. This is the transformation that converted the set of Tables 1.A-C to the set of Tables 3.A-C for the 4-PAM generalized Duobinary example. The transformation steps are:

1. Identify Category 2 outcomes of the DF-RSSD set of tables.
2. Remove the bins corresponding to the above Category 2 outcomes and replace the upper and lower slicing levels of each bin with one slicing level in the midpoint of the two upper and lower slicing levels of the bin. This step essentially removes Category 2 outcomes and shortens the long decision feedback loop (second loop 1620) in the DF-RSSD detector of FIG. 16 into a nested loop and converts the decision feedback loop (first loop 1610) to a decision feed-forward. In contrast to the DFF-RSSD, this transformation step not only does not lead into an increase in the number of slicing levels, but it actually reduces it.

The resulting generalized SDFF-RSSD architecture also maps to the block diagram implementation of DFF-RSSD shown in FIG. 17. The difference between the SDFF-RSSD and DFF-RSSD architectures resides in the number of slice levels implemented by slicer 1750, as well as the internal logic implemented by the other components (e.g. 1780, 1772, 1774, 1776) and the potential differences in the estimated symbol 1778. As a result of these changes, similar timing improvement and even more complexity reduction, illustrated by the 4-PAM generalized Duobinary example, are also achieved in this general case as are discussed above with regard to the SDFF-RSSD example of FIG. 13.

The above-described simplifications in the complexity of a full MLSD implementation may in some examples be achieved without a noticeable penalty in the performance of the detector. This behavior makes SDFF-RSSD potentially attractive for deployment in very high rate data communication systems. Example embodiments may be applied to various high-speed data communication protocols or standards, including serial standards like OIF and various IEEE high-speed serial standards.

Based on the foregoing, various example embodiments of a sequence detector and method are disclosed. Using Table 1.A above as an example, in one embodiment, the weighting factor (C=+2α/3) and the set of samples (y[k]) comprises a value (y[k]+C) falling within one of a plurality of sub-ranges (each of the sub-ranges of y[k]+C in the leftmost column of Table 1.A, e.g. between +⅓−α/3 and +⅓+α/3 in the second row), the plurality of sub-ranges comprising: one or more unambiguous hyper-state outcome sub-ranges corresponding to unambiguous hyper-state outcomes (the three unambiguous "Category 1" bins at rows 1, 3, and 5 of Table 1.A); and one or more ambiguous hyper-state outcome sub-ranges corresponding to ambiguous hyper-state outcomes (the two ambiguous "Category 2" sub-bins at rows 2 and 4 of Table 1.A).

In a further embodiment, using Table 2.A as an example, the binned representation generated by the slicer 1066 corresponds to one of a plurality of bins (rows 1-7 in the leftmost or right-most columns), the plurality of bins comprising: one or more unambiguous hyper-state outcome bins (bins 1, 4, or 7 at rows 1, 4, or 7) corresponding to the one or more unambiguous hyper-state sub-ranges (the ranges of y[k]+C defined in the leftmost column at rows 1, 4, and 7); and one or more approximated hyper-state outcome bins (bins 2-3 and 5-6 at rows 2-3 and 5-6) corresponding to a portion of one of the ambiguous hyper-state outcome sub-ranges (e.g. row 2 or 4 of Table 1.A), wherein each approximated hyper-state outcome bin corresponds to an estimated hyper-state outcome (e.g. Outcome C for bin 2 at row 2) based on proximity of the sub-range portion to one or more of the unambiguous hyper-state outcome sub-ranges (e.g. the proximity of the sub-range of row 2 to the sub-range of unambiguous row 1 dictates that Outcome C of row 1 is also the predicted outcome of row 2).

In a further embodiment, using Table 2.A as an example, at least one of the approximated hyper-state outcome bins (e.g. bin 2 at row 2) corresponds to a portion of one of the ambiguous hyper-state outcome sub-ranges extending from a proximate edge of a first unambiguous hyper-state outcome sub-range (i.e. the bottom of the range of row 1 where y[k]+C=+⅓+α/3) to the midpoint (y[k]+C=+⅓) between the proximate edge of the first unambiguous hyper-state outcome sub-range (y[k]=+⅓+α/3) and a proximate edge of a second unambiguous hyper-state outcome sub-range (i.e. the top of the range of row 4 where y[k]+C=+⅓−α/3).

In a further embodiment, using Table 3.A as an example, the plurality of bins comprise: one or more combined hyper-state outcome bins (rows 1-3 in the leftmost or right-most column) corresponding to one or more combined sub-ranges (e.g. row 1 in Table 3.A corresponds to the combined sub-ranges of rows 1 and 2 of Table 2.A), wherein each combined sub-range encompasses one or more unambiguous hyper-state outcome sub-ranges (e.g. row 1 from Table 2.A) and one or more portions of one or more ambiguous hyper-state outcome sub-ranges (e.g. row 2 from Table 2.A).

In a further embodiment, using Table 3.A as an example, at least one of the combined sub-ranges encompasses: a first unambiguous hyper-state outcome sub-range (e.g. row 1 from Table 2.A); and a portion of one of the ambiguous hyper-state outcome sub-ranges extending from a proximate edge of the first unambiguous hyper-state outcome sub-range (e.g. the bottom of row 1 of Table 2.A where y[k]+C=+⅓+α/3) to the midpoint (y[k]+C=+⅓) between the proximate edge of the first unambiguous hyper-state outcome sub-range (+⅓+α/3) and a proximate edge of a second unambiguous hyper-state outcome sub-range (the top of the range of row 4 of Table 2.A where y[k]+C=+⅓−α/3).

Although the embodiments above have been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A sequence detector for detecting a sequence of symbols corresponding to a transmitted sequence of symbols in accordance with a sequence of samples received, the detector comprising:
   a slicer for generating a binned representation of a combination of a weighting factor and a set of samples from the received sequence;
   a memory element for providing a delayed version of the output of the slicer as an input to control selection of the weighting factor; and
   a reduced-state sequence detector (RSSD) comprising a branch metric calculator, a state metric calculator and a path memory,
      the branch metric calculator receiving as an input the received sequence of samples, the output of the slicer, and a fed forward output of the memory element,
      the state metric calculator receiving as an input the output of the branch metric calculator, and
      the path memory for generating a set of estimated symbols in accordance with output of the state metric calculator and the received sequence of samples.

2. The sequence detector of claim 1, wherein the combination of the weighting factor and the set of samples comprises adding the value of the weighting factor to the set of samples.

3. The sequence detector of claim 1, wherein the weighting factor is selected to compensate for the presence of inter-symbol interference in the set of samples.

4. The sequence detector of claim 3, wherein:
   the sequence of symbols has F number of possible states;
   the RSSD operates on a reduced state sequence having R number of hyper-states, where R is less than F; and
   the F states are partitioned into the R hyper-states.

5. The sequence detector of claim 4, wherein the binned representation generated by the slicer comprises hyper-state outcome information.

6. The sequence detector of claim 5, wherein the hyper-state outcome information comprises estimated outcome information estimating a likely state within at least one hyper-state of the reduced state sequence.

7. The sequence detector of claim 6, wherein the combination of the weighting factor and the set of samples comprises a value falling within one of a plurality of sub-ranges, the plurality of sub-ranges comprising:

one or more unambiguous hyper-state outcome sub-ranges corresponding to unambiguous hyper-state outcomes; and one or more ambiguous hyper-state outcome sub-ranges corresponding to ambiguous hyper-state outcomes.

8. The sequence detector of claim 7, wherein the binned representation generated by the slicer corresponds to one of a plurality of bins, the plurality of bins comprising:

one or more unambiguous hyper-state outcome bins corresponding to the one or more unambiguous hyper-state sub-ranges; and one or more approximated hyper-state outcome bins corresponding to a portion of one of the ambiguous hyper-state outcome sub-ranges, wherein each approximated hyper-state outcome bin corresponds to an estimated hyper-state outcome based on proximity of the sub-range portion to one or more of the unambiguous hyper-state outcome sub-ranges.

9. The sequence detector of claim 8, wherein at least one of the approximated hyper-state outcome bins corresponds to a portion of one of the ambiguous hyper-state outcome sub-ranges extending from a proximate edge of a first unambiguous hyper-state outcome sub-range to the midpoint between the proximate edge of the first unambiguous hyper-state outcome sub-range and a proximate edge of a second unambiguous hyper-state outcome sub-range.

10. The sequence detector of claim 7, wherein the plurality of bins comprise:

one or more combined hyper-state outcome bins corresponding to one or more combined sub-ranges, wherein each combined sub-range encompasses one or more unambiguous hyper-state outcome sub-ranges and one or more portions of one or more ambiguous hyper-state outcome sub-ranges.

11. The sequence detector of claim 10, wherein at least one of the combined sub-ranges encompasses:

a first unambiguous hyper-state outcome sub-range; and a portion of one of the ambiguous hyper-state outcome sub-ranges extending from a proximate edge of the first unambiguous hyper-state outcome sub-range to the midpoint between the proximate edge of the first unambiguous hyper-state outcome sub-range and a proximate edge of a second unambiguous hyper-state outcome sub-range.

12. A method for detecting a sequence of symbols corresponding to a transmitted sequence of symbols in accordance with a sequence of samples received, comprising:

combining a weighting factor and a set of samples from the received sequence;

generating a binned representation of the combination of the weighting factor and the set of samples using a slicer;

selecting the weighting factor based on a delayed version of the output of the slicer;

calculating a plurality of branch metrics for a reduced state sequence detection (RSSD) algorithm based on the received sequence of samples, the output of the slicer, and the delayed version of the output of the slicer;

calculating a plurality of state metrics for the RSSD algorithm based on the output of the branch metric calculator; and generating a set of estimated symbols based on the state metrics and the received sequence of samples.

13. The method of claim 12, wherein combining the weighting factor and the set of samples comprises adding the value of the weighting factor to the set of samples.

14. The method of claim 12, wherein the weighting factor is selected to compensate for the presence of inter-symbol interference in the set of samples.

15. The method of claim 14, wherein:

the sequence of symbols has F number of possible states;

the RSSD algorithm operates on a reduced state sequence having R number of hyper-states, where R is less than F; and the F states are partitioned into the R hyper-states.

16. The method of claim 15, wherein the binned representation generated by the slicer comprises hyper-state outcome information.

17. The method of claim 16, wherein the hyper-state outcome information comprises estimated outcome information estimating a likely state within at least one hyper-state of the reduced state sequence.

18. The method of claim 17, wherein the combination of the weighting factor and the set of samples comprises a value falling within one of a plurality of sub-ranges, the plurality of sub-ranges comprising:

one or more unambiguous hyper-state outcome sub-ranges corresponding to unambiguous hyper-state outcomes; and one or more ambiguous hyper-state outcome sub-ranges corresponding to ambiguous hyper-state outcomes.

19. The method of claim 18, wherein the binned representation generated by the slicer corresponds to one of a plurality of bins, the plurality of bins comprising:

one or more unambiguous hyper-state outcome bins corresponding to the one or more unambiguous hyper-state sub-ranges; and one or more approximated hyper-state outcome bins corresponding to a portion of one of the ambiguous hyper-state outcome sub-ranges, wherein each approximated hyper-state outcome bin corresponds to an estimated hyper-state outcome based on proximity of the sub-range portion to one or more of the unambiguous hyper-state outcome sub-ranges.

20. The method of claim 19, wherein at least one of the approximated hyper-state outcome bins corresponds to a portion of one of the ambiguous hyper-state outcome sub-ranges extending from a proximate edge of a first unambiguous hyper-state outcome sub-range to the midpoint between the proximate edge of the first unambiguous hyper-state outcome sub-range and a proximate edge of a second unambiguous hyper-state outcome sub-range.

21. The method of claim 18, wherein the plurality of bins comprise:

one or more combined hyper-state outcome bins corresponding to one or more combined sub-ranges, wherein each combined sub-range encompasses one or more unambiguous hyper-state outcome sub-ranges and one or more portions of one or more ambiguous hyper-state outcome sub-ranges.

22. The method of claim 21, wherein at least one of the combined sub-ranges encompasses:

a first unambiguous hyper-state outcome sub-range; and a portion of one of the ambiguous hyper-state outcome sub-ranges extending from a proximate edge of the first unambiguous hyper-state outcome sub-range to the midpoint between the proximate edge of the first unambiguous hyper-state outcome sub-range and a proximate edge of a second unambiguous hyper-state outcome sub-range.

* * * * *